(12) United States Patent
Suzuki et al.

(10) Patent No.: US 7,843,706 B2
(45) Date of Patent: Nov. 30, 2010

(54) CIRCUIT CONTROLLER, INRUSH CURRENT LIMITING CIRCUIT, INRUSH CURRENT LIMITING CIRCUIT WITH BATTERY, INVERTER, AND INVERTER WITH BATTERY

(75) Inventors: Masahiko Suzuki, Aichi-ken (JP); Kouta Togashi, Takatsuki (JP); Tetsuya Mizoguchi, Wakayama (JP); Yukie Uemura, Toyohashi (JP); Kunio Kanamaru, Okazaki (JP)

(73) Assignee: Panasonic EV Energy Co., Ltd., Kosai-Shi (JP)

( * ) Notice: Subject to any disclaimer, the term of this patent is extended or adjusted under 35 U.S.C. 154(b) by 269 days.

(21) Appl. No.: 12/000,760

(22) Filed: Dec. 17, 2007

(65) Prior Publication Data

US 2008/0150369 A1 Jun. 26, 2008

(30) Foreign Application Priority Data

Dec. 22, 2006 (JP) .............................. 2006-346548

(51) Int. Cl.
*H02M 3/335* (2006.01)
(52) U.S. Cl. ....................................... 363/16
(58) Field of Classification Search .................. 363/16, 363/56.03, 56.07, 56.08; 323/908
See application file for complete search history.

(56) References Cited

U.S. PATENT DOCUMENTS

| | | | | |
|---|---|---|---|---|
| 4,382,221 A | * | 5/1983 | Reynolds | 320/153 |
| 4,573,113 A | * | 2/1986 | Bauman | 363/48 |
| 5,012,400 A | * | 4/1991 | Yasuda | 363/95 |
| 5,087,871 A | * | 2/1992 | Losel | 323/299 |
| 5,574,632 A | * | 11/1996 | Pansier | 363/49 |
| 5,834,924 A | * | 11/1998 | Konopka et al. | 323/222 |
| 5,930,130 A | * | 7/1999 | Katyl et al. | 363/53 |
| 6,654,262 B2 | * | 11/2003 | Hussein et al. | 363/49 |
| 6,720,739 B2 | * | 4/2004 | Konopka | 315/225 |
| 6,735,098 B2 | * | 5/2004 | Hussein et al. | 363/56.03 |
| 7,083,017 B2 | * | 8/2006 | Hasuka et al. | 180/65.1 |
| 7,088,192 B2 | * | 8/2006 | Satoh | 331/116 R |
| 7,332,868 B2 | * | 2/2008 | Okamoto et al. | 315/209 R |
| 7,586,727 B2 | * | 9/2009 | Yamashita | 361/93.9 |
| 2007/0091647 A1 | * | 4/2007 | Takemura et al. | 363/16 |
| 2008/0150369 A1 | * | 6/2008 | Suzuki et al. | 307/99 |

FOREIGN PATENT DOCUMENTS

| JP | B2 3269377 | 3/2002 |
|---|---|---|
| JP | B2 3289743 | 6/2002 |

\* cited by examiner

*Primary Examiner*—Adolf Berhane
*Assistant Examiner*—Yemane Mehari
(74) *Attorney, Agent, or Firm*—Oliff & Berridge PLC

(57) ABSTRACT

An inverter according to the invention includes an open circuit instructing device (ECU, Steps S5 to S8). The open circuit instructing device is for opening a switching circuit based on resistor inter-terminal voltage Vrb and resistor current Irb.

6 Claims, 10 Drawing Sheets

CIRCUIT CONTROLLER, INRUSH CURRENT LIMITING CIRCUIT, INRUSH CURRENT LIMITING CIRCUIT WITH BATTERY, INVERTER, AND INVERTER WITH BATTERY

BACKGROUND OF THE INVENTION

1. Field of the Invention

The present invention relates to a circuit controller for opening and closing a switching circuit that allows or disallows energization with current supplied from a d.c. power source through a limiting resistor. The invention also relates to an inrush current limiting circuit and an inverter that are equipped with such a circuit controller.

2. Description of Related Art

There have been proposed various circuit controllers for opening and closing a switching circuit that allows or disallows energization with current supplied from a d.c. power source through a limiting resistor. Also, various inrush current limiting circuits and inverters, which are each equipped with a circuit controller of the above type, have been proposed. (see e.g., Japanese Patent No. 3289743 and Japanese Patent No. 3269377).

Japanese Patent No. 3289743 discloses a technique according to which a filter circuit, which has the same time constant as the time constant dependent on the electrostatic capacitance of a smoothing capacitor of an inverter and on the resistance value of a limiting resistor of the inverter, is used and the current flowing in the limiting resistor is shut off in accordance with a comparison between the output voltage of the filter circuit and the voltage of the smoothing capacitor. More specifically, if the voltage of the smoothing capacitor is lower than the output voltage of the filter circuit, it is determined that a failure such as short-circuit has occurred in the inverter or the smoothing capacitor and the current flowing in the limiting resistor is shut off.

Japanese Patent No. 3269377 discloses a technique according to which after a specified period of time has elapsed after a start of energization, the voltage of the smoothing capacitor is measured and this measured voltage of the smoothing capacitor is compared to a reference voltage for the smoothing capacitor in a normal condition that has been stored beforehand, to thereby determine whether the current flowing in the limiting resistor is to be shut off. More specifically, if the measured voltage of the smoothing capacitor is lower than the reference voltage, it is determined that a failure such as short-circuit has occurred in the inverter or the smoothing capacitor and the current flowing in the limiting resistor is shut off. Another technique is disclosed in which a temperature sensor (that is a thermistor in the embodiment of this patent) for detecting the temperature of the limiting resistor is provided and a check is made to determine whether the temperature of the limiting resistor detected by this temperature sensor exceeds a specified value. If the temperature exceeds the specified value, the energization is shut off.

BRIEF SUMMARY OF THE INVENTION

Since the resistance value of the limiting resistor varies depending on temperature (concretely, the resistance value of the limiting resistor increases as the temperature of the limiting resistor rises), the time constant, which is dependent on the electrostatic capacitance of the smoothing capacitor and the resistance value of the limiting resistor, fluctuates (increases) with changes (rises) in the temperature of the limiting resistor caused by energization. In view of this, it is conceivable that the technique of Japanese Patent No. 3289743 cannot properly determine whether the current flowing in the limiting resistor should be shut off, because the determination is based on a comparison using a filter circuit in which the resistance value of the limiting resistor is regarded as being constant.

Specifically, even when the inverter and the smoothing capacitor are in their normal condition, the temperature of the limiting resistor rises as energization time elapses, accompanied with increases in the resistance value of the limiting resistor, so that the time constant dependent on the electrostatic capacitance of the smoothing capacitor of the inverter and on the resistance value of the limiting resistor of the inverter becomes greater than the time constant of the filter circuit. That is, since the voltage of the smoothing capacitor becomes lower than the output voltage of the filter circuit even when the inverter and the smoothing capacitor are in their normal condition, there may arise a problem that the current flowing in the limiting resistor is shut off by mistake. Since the temperature of the limiting resistor largely fluctuates depending on use environment, seasons and other factors, erroneous shut-off of the current flowing in the limiting resistor is likely to occur, particularly, in cases where the above technique is applied to inverters for automobiles.

The technique disclosed in Japanese Patent No. 3269377, according to which a measured voltage of the smoothing capacitor is compared to a reference voltage of the smoothing capacitor in a normal condition, does not take account of the fact that the time constant depending on the electrostatic capacitance of the smoothing capacitor of the inverter and on the resistance value of the limiting resistor of the inverter varies in accordance with changes in the temperature of the limiting resistor. This sometimes leads to a failure in proper determination of whether or not the current flowing in the limiting resistor should be shut off. More specifically, even when the inverter and the smoothing capacitor are in a normal condition, a measured voltage of the smoothing capacitor becomes lower than the reference voltage, which may cause a problem that the current flowing in the limiting resistor is erroneously shut off.

In the technique in which whether energization is to be shut off is determined according to the temperature of the limiting resistor detected by a temperature sensor, accurate detection of the temperature of the limiting resistor by a temperature sensor is difficult and therefore it is doubtful that an abnormal rise in the temperature of the limiting resistor could be adequately detected by this technique. In addition, this techniques has revealed such a problem that a temperature sensor, a temperature detection circuit and others are additionally used in order to detect the temperature of the limiting resistor, which disadvantageously leads to an increase in the number of parts, the cost of the whole system (circuit) and the space for installation.

The present invention is directed to overcoming the above problems and a primary object of the invention is therefore to provide a circuit controller, inrush current limiting circuit and inverter which are capable of properly opening a switching circuit according to need without erroneously opening the switching circuit when the resistance value of the limiting resistor rises with an increase in the temperature thereof, so that an abnormal temperature rise (burnout) in the limiting resistor can be prevented.

SUMMARY OF THE INVENTION

To achieve the above object, the present invention provides an inverter comprising: an inverter circuit; a smoothing capacitor located closer to a d.c. power source than the inverter circuit is and connected to the inverter circuit in parallel; a limiting resistor connected to the inverter circuit and the smoothing capacitor in series, for limiting inrush current flowing from the d.c. power source into the inverter circuit and the smoothing capacitor; a switching circuit for allowing and disallowing a flow of resistor current in the limiting resistor; and open circuit instructing means for instructing to open the switching circuit based on the resistor inter-terminal voltage of the limiting resistor and based on the resistor current.

According to another aspect, the present invention provides an inrush current limiting circuit interposed between a d.c. power source and a combination of an inverter circuit and a smoothing capacitor, the circuit comprising: a limiting resistor connected to the inverter circuit and the smoothing capacitor in series, for limiting inrush current from the d.c. power source to the inverter circuit and the smoothing capacitor; a switching circuit for allowing and disallowing a flow of resistor current in the limiting resistor; and open circuit instructing means for instructing to open the switching circuit based on the resistor inter-terminal voltage of the limiting resistor and based on the resistor current.

According to another aspect, the present invention provides a circuit controller for opening and closing a switching circuit provided in an inverter having an inverter circuit; a smoothing capacitor located closer to a d.c. power source than the inverter circuit is and connected to the inverter circuit in parallel; a limiting resistor connected to the inverter circuit and the smoothing capacitor in series, for limiting inrush current flowing from the d.c. power source to the inverter circuit and the smoothing capacitor; and the switching circuit for allowing and disallowing a flow of resistor current in the limiting resistor, the circuit controller comprising an open circuit instructing means for instructing to open the switching circuit based on the resistor inter-terminal voltage of the limiting resistor and based on the resistor current.

In the inverter, the inrush current limiting circuit, and the circuit controller of the invention, the switching circuit is opened based on a resistor inter-terminal voltage and resistor current. Concretely, for example, the temperature of the limiting resistor is calculated from a resistor inter-terminal voltage and resistor current and if this temperature exceeds a specified permissible value, the switching circuit will be opened. Another technique is carried out in such a way that a reference capacitor inter-terminal voltage for the smoothing capacitor is calculated based on a resistor inter-terminal voltage and resistor current and if an actual capacitor inter-terminal voltage is lower than the reference capacitor inter-terminal voltage, the switching circuit will be opened. Thereby, energization with current flowing through the limiting resistor can be stopped to prevent an abnormal temperature rise (burnout) in the limiting resistor.

In the inverter, the inrush current limiting circuit, and the circuit controller of the invention, the switching circuit is opened based on an actually measured or calculated resistor inter-terminal voltage and resistor current, that is, a resistor inter-terminal voltage and resistor current corresponding to an actual resistance value (that takes account of the temperature of the limiting resistor). This technique eliminates erroneous opening of the switching circuit caused by not taking account of increases in the resistance value owing to temperature rises in the limiting resistor (accompanied with increases in the time constant dependent on the electrostatic capacitance of the smoothing capacitor and the resistance value of the limiting resistor). Accordingly, the switching circuit can be properly opened, thereby preventing an abnormal temperature rise (burnout) in the limiting resistor.

If the inverter circuit and the smoothing capacitor are in their normal condition (i.e., when troubles such as short-circuit have not occurred), energization can be properly continued without erroneously opening the switching circuit. On the other hand, if there occurs a trouble (e.g., short-circuit or a decrease in insulating resistance) in which an undesired current flows into the inverter circuit or the smoothing capacitor from the d.c. power source, the switching circuit will be properly opened, thereby shutting off energization with current supplied through the limiting resistor to prevent an abnormal temperature rise (burnout) in the limiting resistor.

The above inverter preferably includes a current sensor for measuring the resistor current; a power source voltage sensor for measuring power source voltage in a region located closer to the d.c. power source than the limiting resistor is and a capacitor voltage sensor for measuring the capacitor inter-terminal voltage of the smoothing capacitor; or alternatively, a resistor voltage sensor for measuring the resistor inter-terminal voltage of the limiting resistor; voltage obtaining means for obtaining the power source voltage from the power source voltage sensor and the capacitor inter-terminal voltage from the capacitor voltage sensor; or for obtaining the resistor inter-terminal voltage from the resistor voltage sensor; and open circuit instructing means for instructing to open the switching circuit based on the resistor inter-terminal voltage of the limiting resistor that is calculated from the power source voltage and the capacitor inter-terminal voltage or obtained from the resistor voltage sensor and based on the resistor current measured by the current sensor.

The above inrush current limiting circuit preferably includes a current sensor for measuring the resistor current; the power source voltage sensor for measuring the power source voltage in a region located closer to the d.c. power source than the limiting resistor is; or alternatively, a resistor voltage sensor for measuring the resistor inter-terminal voltage of the limiting resistor; voltage obtaining means for obtaining the capacitor inter-terminal voltage of the smoothing capacitor and the power source voltage from the power source voltage sensor; or for obtaining the resistor inter-terminal voltage from the resistor voltage sensor; and open circuit instructing means for instructing to open the switching circuit based on the resistor inter-terminal voltage of the limiting resistor that is calculated from the power source voltage and the capacitor inter-terminal voltage or obtained from the resistor voltage sensor and based on the resistor current measured by the current sensor.

The circuit controller preferably includes a voltage obtaining means for obtaining the power source voltage in a region located closer to the d.c. power source than the limiting resistor is and the capacitor inter-terminal voltage of the smoothing capacitor; or for obtaining the resistor inter-terminal voltage of the limiting resistor; and open circuit instructing means for instructing to open the switching circuit based on the resistor inter-terminal voltage that is calculated from the power source voltage and the capacitor inter-terminal voltage or obtained from the voltage obtaining means and based on the resistor current.

In the inverter and the inrush current limiting circuit of the invention, the inter-terminal voltage is calculated from the power source voltage that is obtained from the power source voltage sensor and the capacitor inter-terminal voltage that is obtained from the capacitor voltage sensor, or the resistor inter-terminal voltage is obtained from the resistor voltage sensor. Further, the resistor current is obtained by measuring with the current sensor. Therefore, the resistor inter-terminal voltage and the resistor current can be obtained without difficulty.

Further, in the circuit controller of the invention, the power source voltage and the capacitor inter-terminal voltage are obtained, and the resistor inter-terminal voltage is calculated thereby, or the resistor inter-terminal voltage is obtained by the voltage obtaining means. Therefore, the resistor inter-terminal voltage and the resistor current can be obtained without difficulty.

Any one of the above inverters preferably includes the open circuit instructing means comprising: fixed time reference voltage calculating means for calculating a reference capacitor inter-terminal voltage of the smoothing capacitor at a time point at which a reference time elapses, based on a resistor inter-terminal voltage and resistor current at the time point at which the reference time elapses, after a start of energization with current supplied from the d.c. power source through the switching circuit and the limiting resistor at least in a stage of activating the inverter; and voltage-basis open circuit determining means for determining whether or not the switching circuit is to be opened based on the reference capacitor inter-terminal voltage and a capacitor inter-terminal voltage of the smoothing capacitor at the time point at which the reference time elapses.

Any one of the above inrush current limiting circuits preferably includes the open circuit instructing means comprising: fixed time reference voltage calculating means for calculating a reference capacitor inter-terminal voltage of the smoothing capacitor at a time point at which a reference time elapses, based on a resistor inter-terminal voltage and resistor current at the time point at which the reference time elapses, after a start of energization with current supplied from the d.c. power source through the switching circuit and the limiting resistor at least in a stage of activating an inverter equipped with the inrush current limiting circuit, the inverter circuit and the smoothing capacitor; and voltage-basis open circuit determining means for determining whether or not the switching circuit is to be opened based on the reference capacitor inter-terminal voltage and a capacitor inter-terminal voltage of the smoothing capacitor at the time point at which the reference time elapses.

Any one of the above circuit controllers preferably includes the open circuit instructing means comprising: fixed time reference voltage calculating means for calculating a reference capacitor inter-terminal voltage of the smoothing capacitor at a time point at which a reference time elapses, based on a resistor inter-terminal voltage and resistor current at the time point at which the reference time elapses, after a start of energization with current supplied from the d.c. power source through the switching circuit and the limiting resistor at least in a stage of activating the inverter; and voltage-basis, open circuit determining means for determining whether or not the switching circuit is to be opened based on the reference capacitor inter-terminal voltage and a capacitor inter-terminal voltage of the smoothing capacitor at the time point at which the reference time elapses.

In the inverter, the inrush current limiting circuit, and the circuit controller of the invention, a reference capacitor inter-terminal voltage of the smoothing capacitor at a time point at which a specified reference time elapses is calculated based on a resistor inter-terminal voltage and resistor current corresponding to the time point at which the reference time elapses, after a start of energization with current supplied from the d.c. power source through the switching circuit and the limiting resistor. Then, whether or not the switching circuit is to be opened is determined based on the reference capacitor inter-terminal voltage and the capacitor inter-terminal voltage at the time point at which the reference time elapses (i.e., the actual, measured capacitor inter-terminal voltage).

More concretely, the capacitor inter-terminal voltage is compared to the reference capacitor inter-terminal voltage and if the capacitor inter-terminal voltage is lower than the reference capacitor inter-terminal voltage, it is determined that a trouble such as short-circuit has occurred in the inverter circuit or the smoothing capacitor and that the switching circuit is to be opened. On the other hand, if the capacitor inter-terminal voltage is higher than the reference capacitor inter-terminal voltage, it is determined that the inverter circuit and the smoothing capacitor are in their normal condition (troubles such as short-circuit have not occurred) and the switching circuit is not to be opened (i.e., the switching circuit is kept in its closed condition).

Thus, the inverter of the invention uses the reference capacitor inter-terminal voltage, which is calculated based on the actual resistor inter-terminal voltage and resistor current at the judgment point (i.e., the time point at which the reference time elapses), as a criterion for determining whether or not the switching circuit is to be opened. That is, even if the resistance value of the limiting resistor increases in accordance with rises in the temperature of the limiting resistor entailed by energization, the reference capacitor inter-terminal voltage is calculated based on the resistor inter-terminal voltage and resistor current corresponding to the increased resistance value and is used for determining whether the switching circuit is to be opened. As a result, a determination of whether or not the switching circuit is to be opened can be adequately made.

In the above inverter, preferably, the fixed time reference voltage calculating means calculates a reference capacitor inter-terminal voltage VScb at a time point at which a reference time tb elapses from:

$$VScb = Vbb \times [1 - \exp((-tb \times Irb)/(C \times Vrb))] \qquad \text{Eq. (1)}$$

where C is the electrostatic capacitance of the smoothing capacitor; tb is the reference time; Vrb is the resistor inter-terminal voltage at the time point at which the reference time tb elapses; Irb is the resistor current at the time point at which the reference time tb elapses; and Vbb is the power source voltage at the time point at which the reference time tb elapses.

In the above inrush current limiting circuit, preferably, the fixed time reference voltage calculating means calculates a reference capacitor inter-terminal voltage VScb at a time point at which a reference time tb elapses from:

$$VScb = Vbb \times [1 - \exp((-tb \times Irb)/(C \times Vrb))] \qquad \text{Eq. (1)}$$

where C is the electrostatic capacitance of the smoothing capacitor; tb is the reference time; Vrb is the resistor inter-terminal voltage at the time point at which the reference time tb elapses; Irb is the resistor current at the time point at which the reference time tb elapses; and Vbb is the power source voltage at the time point at which the reference time tb elapses.

In the above circuit controller, preferably, the fixed time reference voltage calculating means calculates a reference capacitor inter-terminal voltage VScb at a time point at which a reference time tb elapses from:

$$VScb = Vbb \times [1 - \exp((-tb \times Irb)/(C \times Vrb))] \qquad \text{Eq. (1)}$$

where C is the electrostatic capacitance of the smoothing capacitor; tb is the reference time; Vrb is the resistor inter-terminal voltage at the time point at which the reference time tb elapses; Irb is the resistor current at the time point at which the reference time tb elapses; and Vbb is the power source voltage at the time point at which the reference time tb elapses.

As described earlier, the resistance value Rr of the limiting resistor varies in accordance with temperature. Concretely, the resistance value Rr increases as the temperature of the limiting resistor rises. Therefore, since the resistance value Rr gradually increases with time after a start of energization, the time constant $\tau(\tau=C\times Rr)$ dependent on the electrostatic capacitance C of the smoothing capacitor and the resistance value Rr of the limiting resistor also gradually increases.

To cope with this, the inverter, the inrush current limiting circuit, and the circuit controller of the invention are configured to calculate a reference capacitor inter-terminal voltage VScb from Equation (1), using a resistor inter-terminal voltage Vrb and resistor current Irb that correspond to a resistance value Rrb of the limiting resistor at a time point at which a specified reference time tb elapses since the start of energization. Equation (1) gives, as the reference capacitor inter-terminal voltage VScb, the capacitor inter-terminal voltage of the smoothing capacitor for the case where the time constant does not vary during the period between the start of energization and the elapse of the specified reference time tb and where the time constant is the actual time constant $\tau b$ ($\tau b = C \times Rrb = C \times Vrb/Irb$) at the time point at which the specified reference time tb elapses. Specifically, Equation 1 gives, as the reference capacitor inter-terminal voltage VScb, a capacitor inter-terminal voltage when the time constant stays constant, being equal to the greatest time constant $\tau b$ in the period between the start of energization and the elapse of the specified reference time tb, that is, the time constant $\tau b$ with which the smoothing capacitor is electrically charged at the slowest speed.

If the inverter circuit and the smoothing capacitor are in their normal condition (i.e., when troubles such as short-circuit have not occurred), the resistance value of the limiting resistor gradually increases after a start of energization and it is therefore conceivable that the time constant $\tau$ gradually increases with time, becoming $\tau b$ at the elapsing point of the specified reference time tb. Therefore, the actual capacitor inter-terminal voltage Vcb at the elapsing point of the specified reference time tb becomes the inter-terminal voltage of the smoothing capacitor charged in accordance with the time constant $\tau$ that varies in the above manner. As described above, the time constant $\tau$ increases with time after the start of energization until the specified reference time tb, whereas the time constant at each time point during the period is equal to or less than the time constant $\tau b$ in magnitude. Therefore, the actual capacitor inter-terminal voltage Vcb is thought to be higher than the value obtained by Equation (1), that is, the reference capacitor inter-terminal voltage VScb that is obtained provided that the smoothing capacitor is charged with the unchanged time constant $\tau b$ after the start of energization until the specified reference time tb elapses.

On the other hand, if a trouble (e.g., short-circuit) has occurred in the inverter circuit or the smoothing capacitor, the actual capacitor inter-terminal voltage Vcb is thought to be lower than the reference capacitor inter-terminal voltage VScb.

By virtue of the reference capacitor inter-terminal voltage VScb obtained by use of Equation (1), it becomes possible to properly determine whether the inverter circuit and the smoothing capacitor are in their normal or abnormal condition through the comparison between the actual capacitor inter-terminal voltage Vcb and the reference capacitor inter-terminal voltage VScb. Therefore, determination of whether or not the switching circuit is to be opened can be properly made.

The above inverter is preferably provided with voltage-basis open circuit determining means that determines to open the switching circuit if the capacitor inter-terminal voltage Vcb at the elapsing point of the specified reference time tb is lower than the reference capacitor inter-terminal voltage VScb.

In the above inrush current limiting circuit, preferably, the voltage-basis open circuit determining means determines to open the switching circuit if the capacitor inter-terminal voltage Vcb at the elapsing point of the specified reference time tb is lower than the reference capacitor inter-terminal voltage VScb.

In the above circuit controller, preferably, the voltage-basis open circuit determining means determines to open the switching circuit if the capacitor inter-terminal voltage Vcb at the elapsing point of the specified reference time tb is lower than the reference capacitor inter-terminal voltage VScb.

If a trouble such as short-circuit has occurred in the inverter circuit or the smoothing capacitor, the actual capacitor inter-terminal voltage Vcb at the elapsing point of the reference time tb after the start of energization becomes lower than the reference capacitor inter-terminal voltage VScb.

To cope with this, the inverter, the inrush current limiting circuit, and the circuit controller are configured to open the switching circuit if the capacitor inter-terminal voltage Vcb at the elapsing point of the specified reference time tb is lower than the reference capacitor inter-terminal voltage VScb. Thereby, the energization with current supplied through the limiting resistor can be shut off without fail to prevent an abnormal temperature rise (burnout) in the limiting resistor if a trouble such as short-circuit has occurred in the inverter circuit or the smoothing capacitor. If the inverter circuit and the smoothing capacitor are in their normal condition on the other hand, the energization can be properly continued without erroneously opening the switching circuit in reaction to a change in the resistance of the limiting resistor.

The above inverter preferably includes the capacitor voltage sensor that measures the capacitor inter-terminal voltage of the smoothing capacitor, wherein the voltage obtaining means includes: sequential voltage obtaining means for obtaining the capacitor inter-terminal voltage each time a specified time elapses, after a start of energization with current supplied from the d.c. power source through the switching circuit and the limiting resistor at least in a stage of activating the inverter; and wherein the open circuit instructing means includes: sequential reference voltage calculating means for calculating the reference capacitor inter-terminal voltage of the smoothing capacitor based on the resistor inter-terminal voltage and the resistor current each time the specified time elapses, after the start of energization; first elapsed time obtaining means for obtaining a first elapsed time elapsing after the start of energization until the reference capacitor inter-terminal voltage reaches a preset voltage value; second elapsed time obtaining means for obtaining a second elapsed time elapsing after the start of energization until the capacitor inter-terminal voltage reaches the preset voltage value; and time-basis open circuit determining means for determining whether or not the switching circuit is to be opened based on the first elapsed time and the second elapsed time.

The above inrush current limiting circuit preferably includes voltage obtaining means for obtaining the capacitor inter-terminal voltage of the smoothing capacitor; wherein the voltage obtaining means includes: sequential voltage obtaining means for obtaining the capacitor inter-terminal voltage each time a specified time elapses, after a start of energization with current supplied from the d.c. power source through the switching circuit and the limiting resistor at least in a stage of activating an inverter equipped with the inrush current limiting circuit, the inverter circuit and the smoothing capacitor; and wherein the open circuit instructing means includes: sequential reference voltage calculating means for calculating the reference capacitor inter-terminal voltage of the smoothing capacitor based on the resistor inter-terminal voltage and the resistor current each time the specified time elapses, after the start of energization; first elapsed time obtaining means for obtaining a first elapsed time elapsing after the start of energization until the reference capacitor inter-terminal voltage reaches a preset voltage value; second elapsed time obtaining means for obtaining a second elapsed time elapsing after the start of energization until the capacitor inter-terminal voltage reaches the preset voltage value; and time-basis open circuit determining means for determining whether or not the switching circuit is to be opened based on the first elapsed time and the second elapsed time.

The above circuit controller preferably includes voltage obtaining means for obtaining the capacitor inter-terminal voltage of the smoothing capacitor, wherein the voltage obtaining means includes: sequential voltage obtaining means for obtaining the capacitor inter-terminal voltage each time a specified time elapses, after a start of energization with current supplied from the d.c. power source through the switching circuit and the limiting resistor at least in a stage of activating the inverter; and wherein the open circuit instructing means includes: sequential reference voltage calculating means for calculating the reference capacitor inter-terminal voltage of the smoothing capacitor based on the resistor inter-terminal voltage and the resistor current each time the specified time elapses, after the start of energization; first elapsed time obtaining means for obtaining a first elapsed time elapsing after the start of energization until the reference capacitor inter-terminal voltage reaches a preset voltage value; second elapsed time obtaining means for obtaining a second elapsed time elapsing after the start of energization until the capacitor inter-terminal voltage reaches the preset voltage value; and time-basis open circuit determining means for determining whether or not the switching circuit is to be opened based on the first elapsed time and the second elapsed time.

In the inverter, the inrush current limiting circuit, and the circuit controller of the invention, whether or not the switching circuit is to be opened is determined based on a first elapsed time and a second elapsed time. The first elapsed time is the time that elapses after the start of energization with current supplied from the d.c. power source through the switching circuit and the limiting resistor until the calculated reference capacitor inter-terminal voltage reaches a preset voltage value. The second elapsed time is the time that elapses after the start of energization until the measured capacitor inter-terminal voltage reaches the preset voltage value.

More concretely, the first elapsed time and the second elapsed time are compared to each other and if the second elapsed time is greater than the first elapsed time, it is determined that a trouble such as short-circuit has occurred in the inverter circuit or the smoothing capacitor and the switching circuit is then opened. If the second elapsed time is not greater than the first elapsed time, it is then determined that the inverter circuit and the smoothing capacitor are in their normal condition (i.e., troubles such as short-circuit have not occurred) and the switching circuit will not be opened (i.e., the switching circuit is kept in its closed condition).

Particularly, in the inverter of the invention, the reference capacitor inter-terminal voltage used as a criterion for determining whether the switching circuit is to be opened is calculated based on the actual resistor inter-terminal voltage and resistor current, each time a specified time elapses. Therefore, even if the resistance value of the limiting resistor increases according to a temperature rise in the limiting resistor caused by the energization, a determination of whether the switching circuit is to be opened can be properly made.

Further, the above inverter is preferably provided with open circuit instructing means that includes forcible open circuit instructing means for forcibly opening the switching circuit without obtaining the second elapsed time, if the capacitor inter-terminal voltage does not reach the preset voltage value at the time point at which a specified limit time elapses after the start of energization.

In the above inrush current limiting circuit, preferably, the open circuit instructing means includes forcible open circuit instructing means for forcibly opening the switching circuit without obtaining the second elapsed time, if the capacitor inter-terminal voltage does not reach the preset voltage value at the time point at which a specified limit time elapses after the start of energization.

In the above circuit controller, preferably, the open circuit instructing means includes forcible open circuit instructing means for forcibly opening the switching circuit without obtaining the second elapsed time, if the capacitor inter-terminal voltage does not reach the preset voltage value at the time point at which a specified limit time elapses after the start of energization.

If the smoothing capacitor is short-circuited, the capacitor inter-terminal voltage does not reach the preset voltage value in some cases even if a long time elapses after the start of energization. In such a case, if the energization is continued until the capacitor inter-terminal voltage reaches the preset voltage value, excessive current is likely to flow into the limiting resistor in a continuous fashion, resulting in an abnormal temperature rise (burnout) in the limiting resistor.

To cope with this problem, the inverter, the inrush current limiting circuit, and the circuit controller of the invention are designed to have the forcible open circuit instructing means for forcibly opening the switching circuit without obtaining the second elapsed time, if the capacitor inter-terminal voltage does not reach the preset voltage value at the elapsing point of the specified limit time after the start of energization. Thereby, the energization with current supplied through the limiting resistor can be properly shut off at the elapsing point of the specified limit time, if there occurs such a trouble that the capacitor inter-terminal voltage does not reach the preset voltage value. As a result, an abnormal temperature rise (burnout) in the limiting resistor can be prevented.

In any one of the above-mentioned inverters, preferably, the sequential reference voltage calculating means calculates a reference capacitor inter-terminal voltage $VSc(t)$ at a time point at which a time t elapses after the start of energization from:

$$VSc(t) = Vb(t) \times [1 - \exp[(-t \times Ir(t))/(C \times Vr(t))]] \qquad \text{Eq. (2)}$$

where C is the electrostatic capacitance of the smoothing capacitor; t is the time elapsing after the start of energization; $Vr(t)$ is a resistor inter-terminal voltage at the time point at which the time t elapses; $Ir(t)$ is an resistor current at the time point at which the time t elapses; and $Vb(t)$ is a power source voltage at the time point at which the time t elapses.

In any one of the above-mentioned inrush current limiting circuits, preferably, the sequential reference voltage calculating means calculates a reference capacitor inter-terminal voltage VSc(t) at a time point at which a time t elapses after the start of energization from:

$$VSc(t)=Vb(t)\times[1-\exp[(-t\times Ir(t))/(C\times Vr(t))]] \quad \text{Eq. (2)}$$

where C is the electrostatic capacitance of the smoothing capacitor; t is the time elapsing after the start of energization; Vr(t) is a resistor inter-terminal voltage at the time point at which the time t elapses; Ir(t) is an resistor current at the time point at which the time t elapses; and Vb(t) is a power source voltage at the time point at which the time t elapses.

In any one of the above-mentioned circuit controllers, preferably, the sequential reference voltage calculating means calculates a reference capacitor inter-terminal voltage VSc(t) at a time point at which a time t elapses after the start of energization from:

$$VSc(t)=Vb(t)\times[1-\exp[(-t\times Ir(t))/(C\times Vr(t))]] \quad \text{Eq. (2)}$$

where C is the electrostatic capacitance of the smoothing capacitor; t is the time elapsing after the start of energization; Vr(t) is a resistor inter-terminal voltage at the time point at which the time t elapses; Ir(t) is an resistor current at the time point at which the time t elapses; and Vb(t) is a power source voltage at the time point at which the time t elapses.

The inverter, the inrush current limiting circuit, and the circuit controller of the invention may be provided with sequential reference voltage calculating means that calculates a reference capacitor inter-terminal voltage VSc(t) at the time point at which a time t elapses, using Equation (2). Concretely, the reference capacitor inter-terminal voltage VSc(t) is obtained from Equation (2) each time a specified time elapses after the start of energization.

Equation (2) gives the reference capacitor inter-terminal voltage VSc(t), using a resistor inter-terminal voltage Vr(t) and resistor current Ir(t) corresponding to the actual resistance value Rr(t) of the limiting resistor at the elapsing point of the time t after the start of energization.

Equation (2) gives, as the reference capacitor inter-terminal voltage VSc(t), the capacitor inter-terminal voltage of the smoothing capacitor when the time constant does not vary during the period between the start of energization and the elapse of the time t and is the actual time constant $\tau(t)$ ($\tau(t)= C\times Rr(t)=C\times Vr(t)/Ir(t)$) at the elapsing point of the time t. More specifically, Equation (2) gives, as the reference capacitor inter-terminal voltage VSc(t), the capacitor inter-terminal voltage obtained in the case where the time constant does not vary, being equal to the greatest time constant $\tau(t)$ in the period between the start of energization and the elapse of the time t, that is, the time constant $\tau(t)$ with which the smoothing capacitor is electrically charged at the slowest speed.

If the inverter circuit and the smoothing capacitor are in their normal condition (i.e., when troubles such as short-circuit have not occurred), the resistance value of the limiting resistor gradually increases after the start of energization, and therefore, it is conceivable that the time constant $\tau(t)$ increases with time. For this reason, the actual capacitor inter-terminal voltage Vc(t) at the elapsing point of the time t increases faster than the value calculated from Equation (2), that is, the reference capacitor inter-terminal voltage VSc(t) obtained in the case where electricity is charged after the start of energization until the elapse of the time t with the unchanged time constant $\tau(t)$ at that time point. It is therefore conceivable that the second elapsed time during which the capacitor inter-terminal voltage Vc(t) reaches the preset voltage value is shorter than the first elapsed time during which the reference capacitor inter-terminal voltage VSc(t) reaches the preset voltage value.

If a trouble such as short-circuit has occurred in the inverter circuit or the smoothing capacitor, the increase of the capacitor inter-terminal voltage Vc(t) is thought to be slower than the increase of the reference capacitor inter-terminal voltage VSc(t). Therefore, the second elapsed time is thought to be longer than the first elapsed time.

The reference capacitor inter-terminal voltage VSc(t) is thus calculated from Equation (2) and compared to the actual capacitor inter-terminal voltage Vc(t), whereby it becomes possible to properly determine whether the inverter circuit and the smoothing capacitor are in a normal or abnormal condition. As a result, a determination of whether or not the switching circuit is to be opened can be properly made.

The above inverter is preferably provided with time-basis open circuit determining means that determines to open the switching circuit if the second elapsed time is longer than the first elapsed time.

In the above inrush current limiting circuit, preferably, the time-basis open circuit determining means determines to open the switching circuit if the second elapsed time is longer than the first elapsed time.

In the above circuit controller, preferably, the time-basis open circuit determining means determines to open the switching circuit if the second elapsed time is longer than the first elapsed time.

If a trouble such as short-circuit has occurred in the inverter circuit or the smoothing capacitor, the second elapsed time which elapses after the start of energization until the actual capacitor inter-terminal voltage Vc(t) reaches the preset voltage value becomes longer than the first elapsed time that elapses after the start of energization until the reference capacitor inter-terminal voltage VSc(t) reaches the preset voltage value.

In view of this, the inverter, the inrush current limiting circuit, and the circuit controller of the invention are designed to open the switching circuit when the second elapsed time is longer than the first elapsed time. Thereby, if a trouble such as short-circuit has occurred in the inverter circuit or the smoothing capacitor, the energization with current supplied through the limiting resistor will be shut off, thereby preventing an abnormal temperature rise (burnout) in the limiting resistor without fail. On the other hand, if the inverter circuit and the smoothing capacitor are in their normal condition, the energization can be properly continued without erroneously opening the switching circuit in reaction to a change in the resistance of the limiting resistor.

In addition, in the above inverter, preferably, the open circuit instructing means includes: temperature calculating means for calculating the temperature of the limiting resistor based on the resistor inter-terminal voltage and the resistor current after a start of energization with current supplied from the d.c. power source through the switching circuit and the limiting resistor at least in a stage of activating the inverter; and temperature-basis open circuit determining means for determining whether or not the switching circuit is to be opened based on the calculated temperature of the limiting resistor.

In the above inrush current limiting circuit, preferably, the open circuit instructing means includes: temperature calculating means for calculating the temperature of the limiting resistor based on the resistor inter-terminal voltage and the resistor current after a start of energization with current supplied from the d.c. power source through the switching circuit and the limiting resistor at least in a stage of activating an inverter equipped with the inrush current limiting circuit, the inverter circuit and the smoothing capacitor; and temperature-basis open circuit determining means for determining whether or not the switching circuit is to be opened based on the calculated temperature of the limiting resistor.

The above circuit controller, preferably, further comprises: temperature calculating means for calculating the temperature of the limiting resistor based on the resistor inter-terminal voltage and the resistor current after a start of energization with current supplied from the d.c. power source through the switching circuit and the limiting resistor at least in a stage of activating the inverter; and temperature-basis open circuit determining means for determining whether or not the switching circuit is to be opened based on the calculated temperature of the limiting resistor.

In the inverter, the inrush current limiting circuit, and the circuit controller of the invention, the temperature of the limiting resistor is calculated based on an actual resistor inter-terminal voltage and resistor current after the start of energization with current supplied from the d.c. power source through the switching circuit and the limiting resistor. Since the temperature of the limiting resistor fluctuates in accordance with the resistance value of the limiting resistor, it can be calculated based on the resistance value of the limiting resistor corresponding to the resistor inter-terminal voltage and resistor current. Especially, the inverter of the invention can accurately calculate the temperature of the limiting resistor based on the actually measured resistor inter-terminal voltage and resistor current. That is, it can obtain a calculated temperature with a small deviation from the actual temperature of the limiting resistor.

In the inverter, the inrush current limiting circuit, and the circuit controller of the invention, the temperature-basis open circuit determining means determines whether or not the switching circuit is to be opened based on an accurately calculated temperature of the limiting resistor (with a small deviation from the actual temperature of the limiting resistor). Thereby, a determination of whether or not the switching circuit is to be opened can be accurately made and, in consequence, an abnormal temperature rise (burnout) in the limiting resistor can be properly prevented.

In addition, such a determination technique not only prevents an abnormal temperature rise in the limiting resistor in cases where a trouble such as short-circuit has occurred in the inverter circuit or the smoothing capacitor but also prevents an abnormal temperature rise in the limiting resistor caused by repetition of reenergization etc. As a result, more adequate prevention of an abnormal rise (burnout) in the limiting resistor can be achieved.

Further, the inverter, the inrush current limiting circuit, and the circuit controller of the invention can obtain the temperature of the limiting resistor by calculation without use of a temperature sensor or the like for detecting the temperature of the limiting resistor. Accordingly, a smaller number of parts are involved compared to the case where the temperature of the limiting resistor is detected by a temperature sensor. This leads to a reduction not only in the production cost but also in the installation space.

For instance, the inverter of the invention may be configured such that the temperature calculating means calculates the temperature of the limiting resistor based on a resistor inter-terminal voltage and resistor current which are measured at the elapsing point of a specified time, and the temperature-basis open circuit determining means makes a comparison between the calculated temperature of the limiting resistor and a preset permissible temperature for the limiting resistor and determines to open the switching circuit if the former is determined to be higher than the latter.

Alternatively, the inverter of the invention may be configured such that the temperature calculating means sequentially calculates the temperature of the limiting resistor based on a resistor inter-terminal voltage and resistor current which are measured each time a specified time elapses and the temperature-basis open circuit determining means makes a comparison between the sequentially calculated temperatures of the limiting resistor and a preset permissible temperature for the limiting resistor and determines to open the switching circuit if a calculated temperature of the limiting resistor is determined to be higher than the permissible temperature.

Another configuration of the inverter is such that the temperature calculating means sequentially calculates the temperature of the limiting resistor based on the resistor inter-terminal voltage and resistor current which are measured every specified time and the temperature-basis open circuit determining means observes the transitional change (rise) of the temperature based on the calculated temperatures of the limiting resistor and determines to open the switching circuit when it is foreseen that the temperature of the limiting resistor will abnormally rise if the energization continues.

The above inverter is preferably configured such that the temperature-basis open circuit means determines to open the switching circuit if a calculated temperature of the limiting resistor exceeds the preset permissible temperature of the limiting resistor.

The above inrush current limiting circuit is preferably configured such that the temperature-basis open circuit means determines to open the switching circuit if a calculated temperature of the limiting resistor exceeds the preset permissible temperature of the limiting resistor.

The above circuit controller is preferably configured such that the temperature-basis open circuit means determines to open the switching circuit if a calculated temperature of the limiting resistor exceeds the preset permissible temperature of the limiting resistor.

In the inverter, the inrush current limiting circuit, and the circuit controller, if a calculated temperature of the limiting resistor exceeds the permissible temperature, it is determined that the switching circuit is to be opened. Thereby, the energization with current supplied through the limiting resistor can be shut off by opening the switching circuit to adequately prevent an abnormal temperature rise (burnout) in the limiting resistor if the temperature of the limiting resistor exceeds the permissible value.

Further, the inverter with a battery preferably comprises any one of the above-mentioned inverters and a battery serving as the d.c. power source.

The inrush current limiting circuit with a battery preferably comprises any one of the above-mentioned inrush current limiting circuits and a battery serving as the d.c. power source.

In the inverter with battery and the inrush current limiting circuit with battery of the invention, the energization with current supplied to the smoothing capacitor and the inverter circuit through the limiting resistor can be properly carried out by use of a battery. Examples of the battery include nickel-metal hydride batteries and lithium ion batteries.

DETAILED DESCRIPTION OF THE PREFERRED EMBODIMENTS

First Embodiment

Referring now to the accompanying drawings, an inverter 21 will be described according to a first embodiment of the invention.

Figure 1:
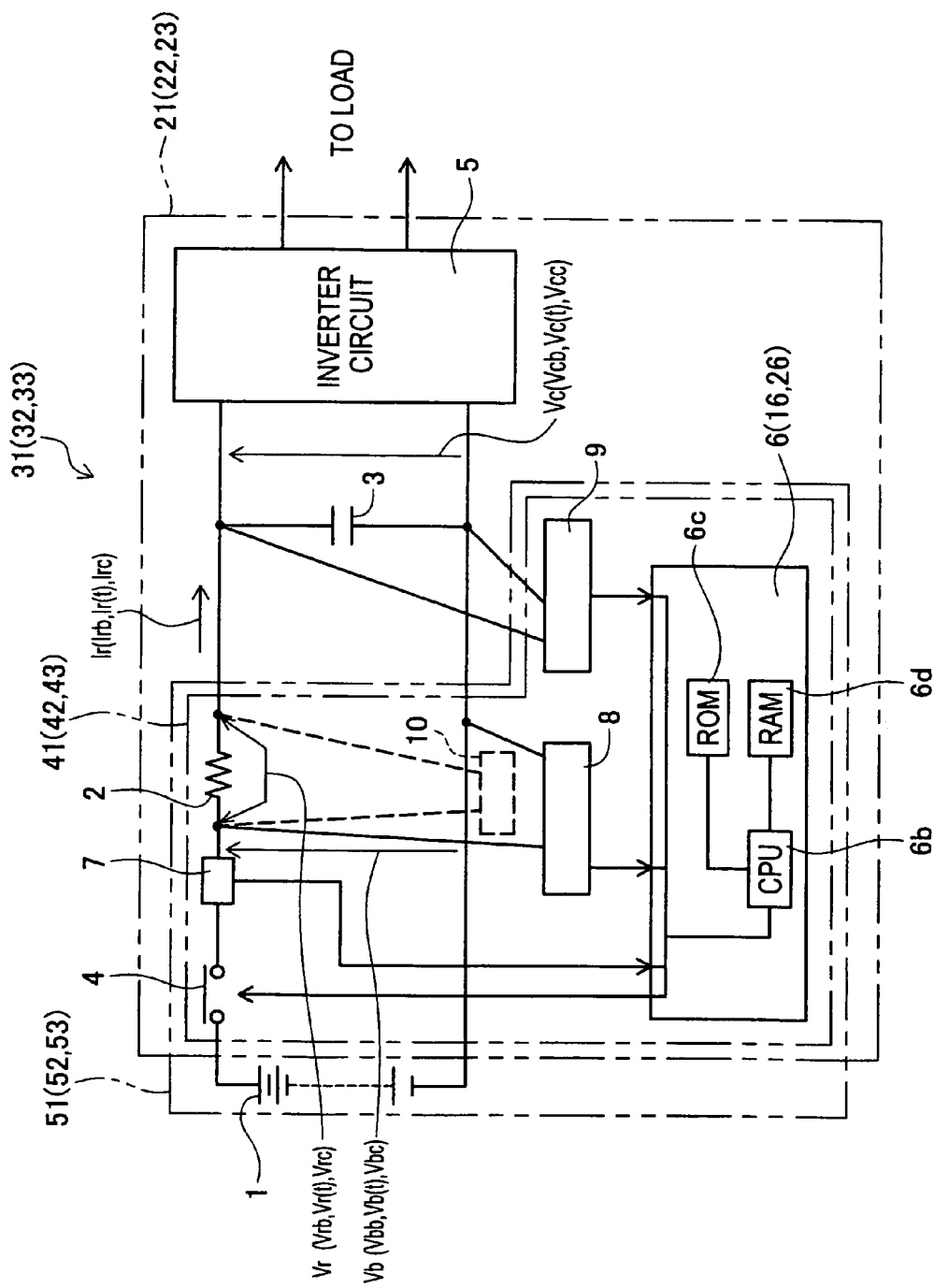
FIG. 1 is a structural diagram of an inverter according to first to third embodiments.

As illustrated in FIG. 1, the inverter 21 has an inverter circuit 5; a smoothing capacitor 3 that is closer to a battery (d.c. power source) 1 than the inverter circuit 5 is and connected to the inverter circuit 5 in parallel; and an inrush current limiting circuit 41 interposed between the battery 1 and the combination of the inverter circuit 5 and the smoothing capacitor 3.

The inrush current limiting circuit 41 has a limiting resistor 2 that is serially connected to the inverter circuit 5 and the smoothing capacitor 3, for limiting inrush current flowing from the battery 1 to the inverter circuit 5 and the smoothing capacitor 3; a switching circuit 4 for intermittently allowing a flow of resistor current Ir in the limiting resistor 2; and a current sensor 7 for measuring the resistor current Ir flowing in the limiting resistor 2. The inrush current limiting circuit 41 further includes a power source voltage sensor 8 for measuring a power source voltage (battery inter-terminal voltage) Vb at a position closer to the battery 1 than the limiting resistor 2; a capacitor voltage sensor 9 for measuring the capacitor inter-terminal voltage Vc of the smoothing capacitor 3; and an ECU (circuit controller) 6 for controlling the opening/closing of the switching circuit 4. By closing the switching circuit 4 (ON) in response to an instruction from the ECU 6, energization with electrical current supplied to the inverter circuit 5 and the smoothing capacitor 3 through the limiting resistor 2 can be started.

The ECU (circuit controller) 6 has a known configuration including a CPU 6b, ROM 6c, RAM 6d etc., and functions to obtain the power source voltage Vb from the power source voltage sensor 8 and the capacitor inter-terminal voltage Vc from the capacitor voltage sensor 9 in accordance with a stored program as described later. Further, the ECU 6 calculates the resistor inter-terminal voltage Vr of the limiting resistor 2 from the obtained power source voltage Vb and capacitor inter-terminal voltage Vc and determines whether the switching circuit 4 is to be opened based on the resistor inter-terminal voltage Vr and the resistor current Ir measured by the current sensor 7.

In the first embodiment, the inverter 21 equipped with the battery 1 is defined as "inverter with battery 31", and the inrush current limiting circuit 41 equipped with the battery 1 is defined as "inrush current limiting circuit with battery 51".

In the first embodiment, an assembled battery composed of many nickel-metal hydride batteries connected in series is used as the battery 1.

Figure 2:
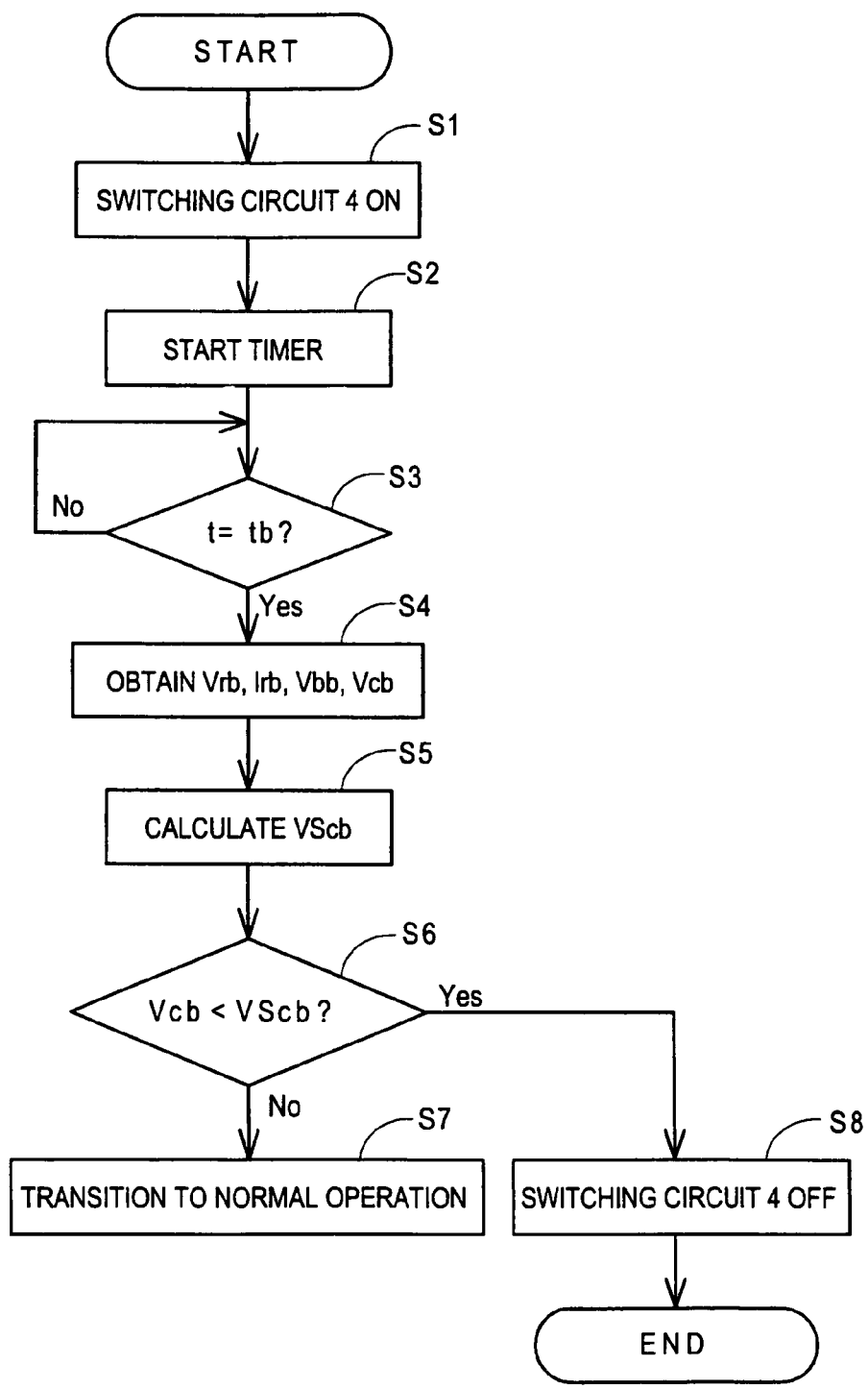
FIG. 2 is a flow chart of opening/closing control for a switching circuit according to the first embodiment.

Reference is made to FIG. 2 to describe the opening/closing control of the inverter 21 according to the first embodiment.

In Step S1, the switching circuit 4 is closed (ON) in response to an instruction from the ECU 6. Thereby, energization is started by supplying current from the battery 1 to the smoothing capacitor 3 and the inverter circuit 5 through the limiting resistor 2 so that the inverter 21 is activated. At that time, inrush current (resistor current Ir) flows from the battery 1 to the smoothing capacitor 3 and the inverter circuit 5. In Step S2, a timer starts to count time t elapsing after the start of energization.

Then, the program proceeds to Step S3 in which the ECU 6 determines whether the time t elapsing after the start of energization has reached a reference time tb prestored in the ROM 6c (t=tb ?). If the elapsed time tb has not reached the reference time tb (NO), the determination of Step S3 is repeated. In the first embodiment, the reference time tb is set to, for instance, 10 msec.

Upon determination that the elapsed time t has reached the reference time tb (YES), the program proceeds to Step S4 in which the ECU 6 obtains the resistor current Ir at the point at which the reference time tb elapses (this resistor current is indicated by "Irb") from the current sensor 7. Further, the ECU 6 obtains the power source voltage Vb at the elapsing point of the reference time tb (this voltage is indicated by "Vbb") from the power source voltage sensor 8 and obtains the capacitor inter-terminal voltage Vc at the elapsing point of the reference time tb (this voltage is indicated by "Vcb") from the capacitor voltage sensor 9. Then, the resistor inter-terminal voltage Vr at the elapsing point of the reference time tb (this voltage is indicated by "Vrb") is calculated by subtracting the capacitor inter-terminal voltage Vcb from the obtained power source voltage Vbb (Vrb=Vbb−Vcb).

Then, the program proceeds to Step S5 to calculate the reference capacitor inter-terminal voltage VScb of the smoothing capacitor 3 at the elapsing point of the reference time tb. More specifically, the reference capacitor inter-terminal voltage VScb is calculated from:

$$VScb = Vbb \times [1 - \exp((-tb \times Irb)/(C \times Vrb))] \qquad \text{Eq. (1)}$$

where C represents the electrostatic capacitance of the smoothing capacitor 3.

As discussed earlier, the resistance value Rr of the limiting resistor 2 fluctuates in accordance with temperature. More concretely, the resistance value Rr increases as the temperature Tr of the limiting resistor 2 rises. Since the resistance value Rr gradually increases with time after the start of energization, the time constant $\tau (\tau = C \times Rr)$ dependent on the electrostatic capacitance C of the smoothing capacitor and the resistance value Rr of the limiting resistor 2 gradually increases.

To cope with this, the first embodiment is designed such that the reference capacitor inter-terminal voltage VScb is calculated from Equation (1), using the resistor inter-terminal voltage Vrb and resistor current Irb that correspond to the resistance value Rrb of the limiting resistor 2 at the elapsing point of the reference time tb after the start of energization. Equation (1) gives, as the reference capacitor inter-terminal voltage VScb, the capacitor inter-terminal voltage of the smoothing capacitor 3 of the case where the time constant does not vary after the start of energization until the elapse of the reference time tb and where the time constant is the actual time constant τb(τb=C×Rrb=C×Vrb/Irb) at the elapsing point of the reference time tb. Specifically, Equation (1) gives, as the reference capacitor inter-terminal voltage VScb, the capacitor inter-terminal voltage Vc when the time constant stays constant, being equal to the greatest time constant τb of the period between the start of energization and the elapse of the specified reference time tb, that is, the time constant τb with which the smoothing capacitor 3 is charged at the slowest speed.

Figure 3:
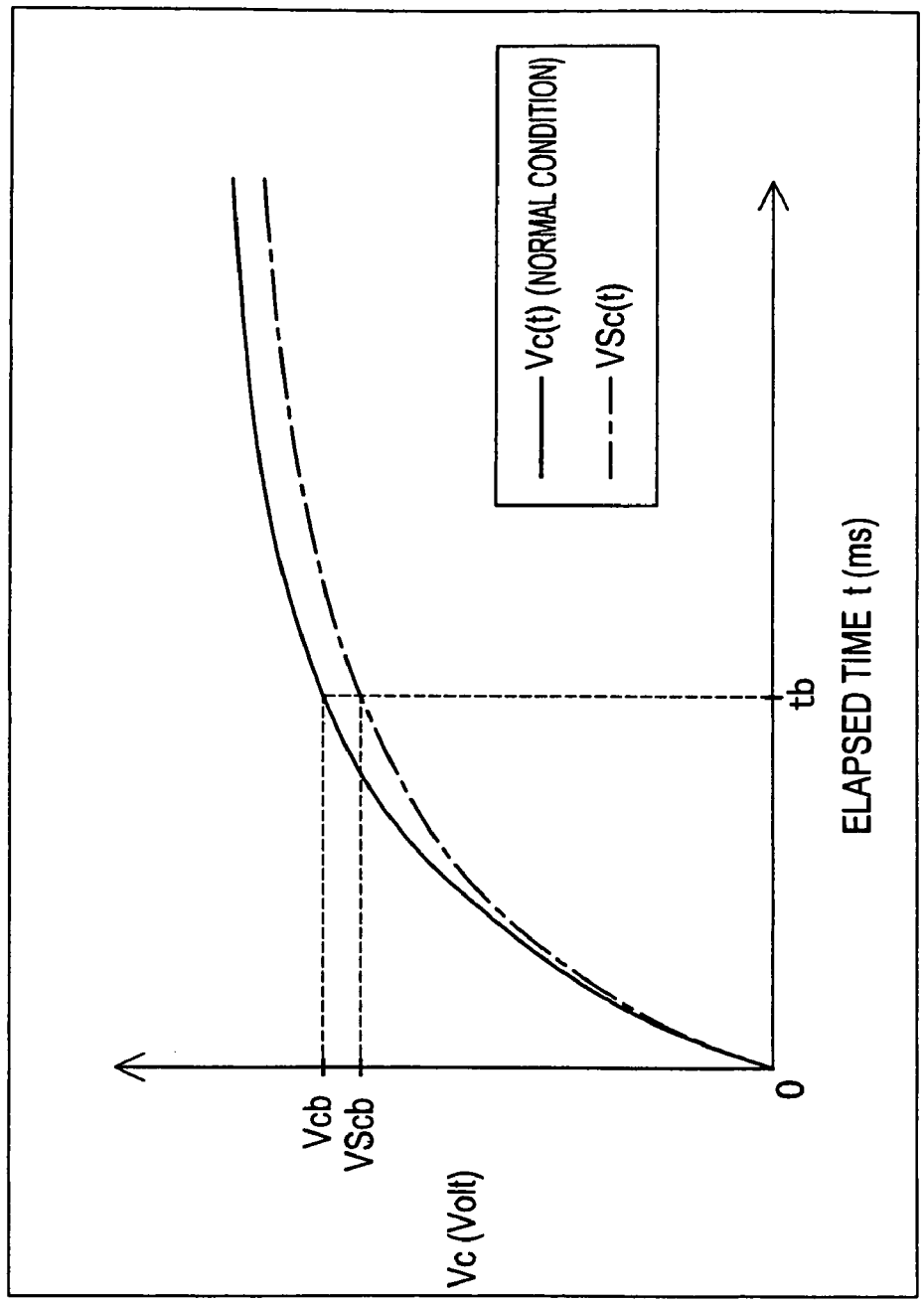
FIG. 3 is a graph showing the relationship between a capacitor inter-terminal voltage Vcb and a reference capacitor inter-terminal voltage VScb in a normal condition in the inverter of the first embodiment.

Herein, the relationship between the time t elapsing after the start of energization and the reference capacitor inter-terminal voltage VSc(t), which is obtained from the following Equation (2), is represented by alternate long and short dash line in FIG. 3. It should be noted that this graph is obtained where Ir(t) and Vr(t) in Equation (2) are values when t=tb, i.e., the fixed values Irb and Vrb. The relationship between the time t elapsing after the start of energization and the actual capacitor inter-terminal voltage Vc(t) of the smoothing capacitor 3 where the inverter circuit 5 and the smoothing capacitor 3 are in a normal condition (i.e., when troubles such as short-circuit have not occurred) is represented by solid line in FIG. 3.

It should be noted that Equation (1) corresponds to a relational expression obtained by substituting tb for time t in Equation (2).

$$VSc(t)=Vb(t)\times[1-\exp[(-t\times Ir(t))/(C\times Vr(t))]]$$ Eq. (2)

If the inverter circuit 5 and the smoothing capacitor 3 are in their normal condition (i.e., when troubles such as short-circuit have not occurred), the resistance value Rr of the limiting resistor 2 gradually increases after a start of energization and therefore the time constant τ increases with time and becomes τb upon elapse of the reference time tb. Therefore, the actual capacitor inter-terminal voltage Vcb at the elapsing point of the reference time tb becomes the inter-terminal voltage of the smoothing capacitor 3 that is charged according to the time constant τ that varies in such a way. As described above, the time constant τ increases with time after a start of energization until an elapse of the reference time tb and the time constant at each time point during this period does not exceed the time constant τb. Accordingly, the actual capacitor inter-terminal voltage Vcb is thought to be larger than the value calculated from Equation (1), that is, the reference capacitor inter-terminal voltage VScb that is obtained on assumption that electrical charging is done with the unchanged time constant τb after a start of energization until an elapse of the reference time tb.

Figure 4:
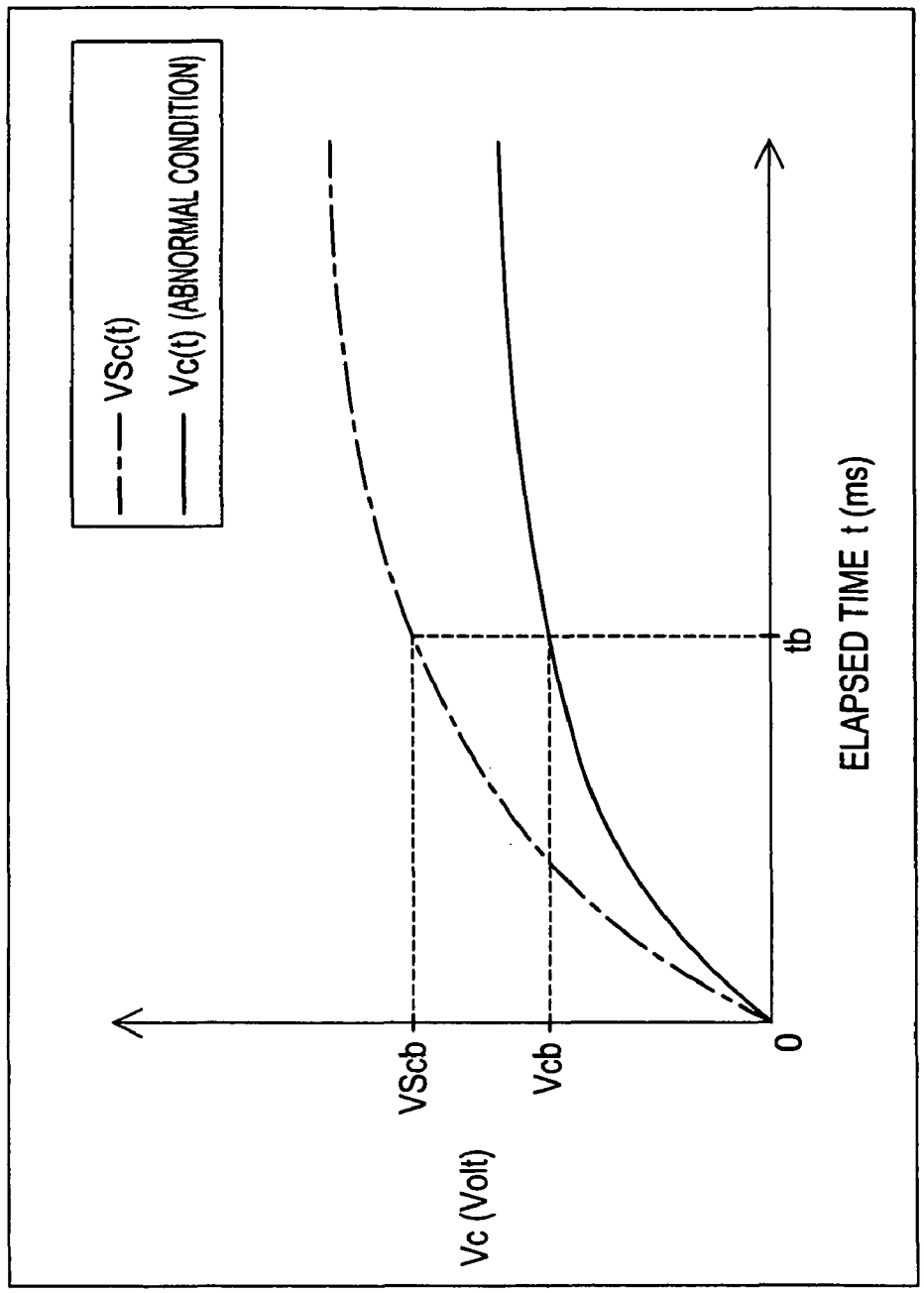
FIG. 4 is a graph showing the relationship between the capacitor inter-terminal voltage Vcb and the reference capacitor inter-terminal voltage VScb in an abnormal condition in the inverter of the first embodiment.

If short-circuit has occurred in the inverter circuit 5 or the smoothing capacitor 3, the actual capacitor inter-terminal voltage Vcb is thought to be lower than the reference capacitor inter-terminal voltage VScb as seen from FIG. 4.

The reference capacitor inter-terminal voltage VScb is calculated from Equation (1) and compared with the actual capacitor inter-terminal voltage Vcb, whereby it becomes possible to properly determine whether the inverter circuit 5 and the smoothing capacitor 3 are in a normal condition or an abnormal condition such as short-circuit. More specifically, a determination of whether or not the switching circuit 4 is to be opened can be properly made in the succeeding Steps S6 to S8.

After calculating the reference capacitor inter-terminal voltage VScb in this way in Step S5, the program proceeds to Step S6 and a check is made to determine whether the capacitor inter-terminal voltage Vcb is lower than the reference capacitor inter-terminal voltage VScb (Vcb<VScb). If the capacitor inter-terminal voltage Vcb is determined to be lower than the reference capacitor inter-terminal voltage VScb (YES), the program proceeds to Step S8 and the ECU 6 sends a command to open the switching circuit 4. Thereby, the energization with current supplied through the limiting resistor 2 can be shut off so that an abnormal temperature rise (burnout) in the limiting resistor 2 can be prevented. On the other hand, if the capacitor inter-terminal voltage Vcb is determined to be equal to or higher than the reference capacitor inter-terminal voltage VScb (NO), the program proceeds to Step S7 and the energization is continued without opening the switching circuit 4 (i.e., while keeping the switching circuit 4 in its closed state). In this condition, the program transitions to start normal operation.

As described above, in the first embodiment, whether or not the switching circuit 4 is to be opened is determined using the reference capacitor inter-terminal voltage VScb as a benchmark, the voltage VScb being calculated based on the actually measured or calculated resistor inter-terminal voltage Vrb and resistor current Irb, that is, the resistor inter-terminal voltage Vrb and resistor current Irb that correspond to the actual resistance value of the limiting resistor 2 (i.e., the resistance value taking account of the temperature of the limiting resistor 2). Unlike the case where an increase in the resistance value (and the subsequent increase in the time constant τ) caused by a rise in the temperature of the limiting resistor 2 is not taken into account, the first embodiment has such an advantage that the switching circuit 4 is not erroneously opened but properly opened according to need and, in consequence, an abnormal temperature rise (burnout) in the limiting resistor 2 can be prevented.

In the first embodiment, if the inverter circuit 5 and the smoothing capacitor 3 are in their normal condition (i.e., when troubles such as short-circuit have not occurred), the energization can be properly continued without erroneously opening the switching circuit 4. On the other hand, if a trouble such as short-circuit has occurred in the inverter circuit 5 or the smoothing capacitor 3, the switching circuit 4 is properly opened thereby shutting off the energization with current supplied through the limiting resistor 2 so that an abnormal temperature rise (burnout) in the limiting resistor 2 can be prevented.

Step S4 of the first embodiment corresponds to the voltage obtaining means of the invention and Steps S5 to S8 correspond to the open circuit instructing means of the invention. Of Steps S5 to S8, Step S5 corresponds to the fixed time reference voltage calculating means of the invention and Steps S6 to S8 correspond to the voltage-basis open circuit determining means of the invention.

Second Embodiment

Next, an inverter 22 (inrush current limiting circuit 42) according to a second embodiment of the invention will be explained with reference to the drawings.

The inverter 22 (inrush current limiting circuit 42) of the second embodiment does not differ from the inverter 21 (inrush current limiting circuit 41) of the first embodiment except the ECU (circuit controller) for controlling the opening/closing of the switching circuit 4. Concretely, the ECU 16 of the second embodiment differs from the ECU 6 of the first embodiment in the processing performed with the stored program (see FIG. 1). Therefore, only the opening/closing control different from that of the first embodiment is explained herein and an explanation of other points will be skipped.

As illustrated in FIG. 1, the inverter 22 equipped with the battery 1 is defined as "inverter with battery 32", and the inrush current limiting circuit 42 equipped with the battery 1 is defined as "inrush current limiting circuit with battery 52".

Figure 5:
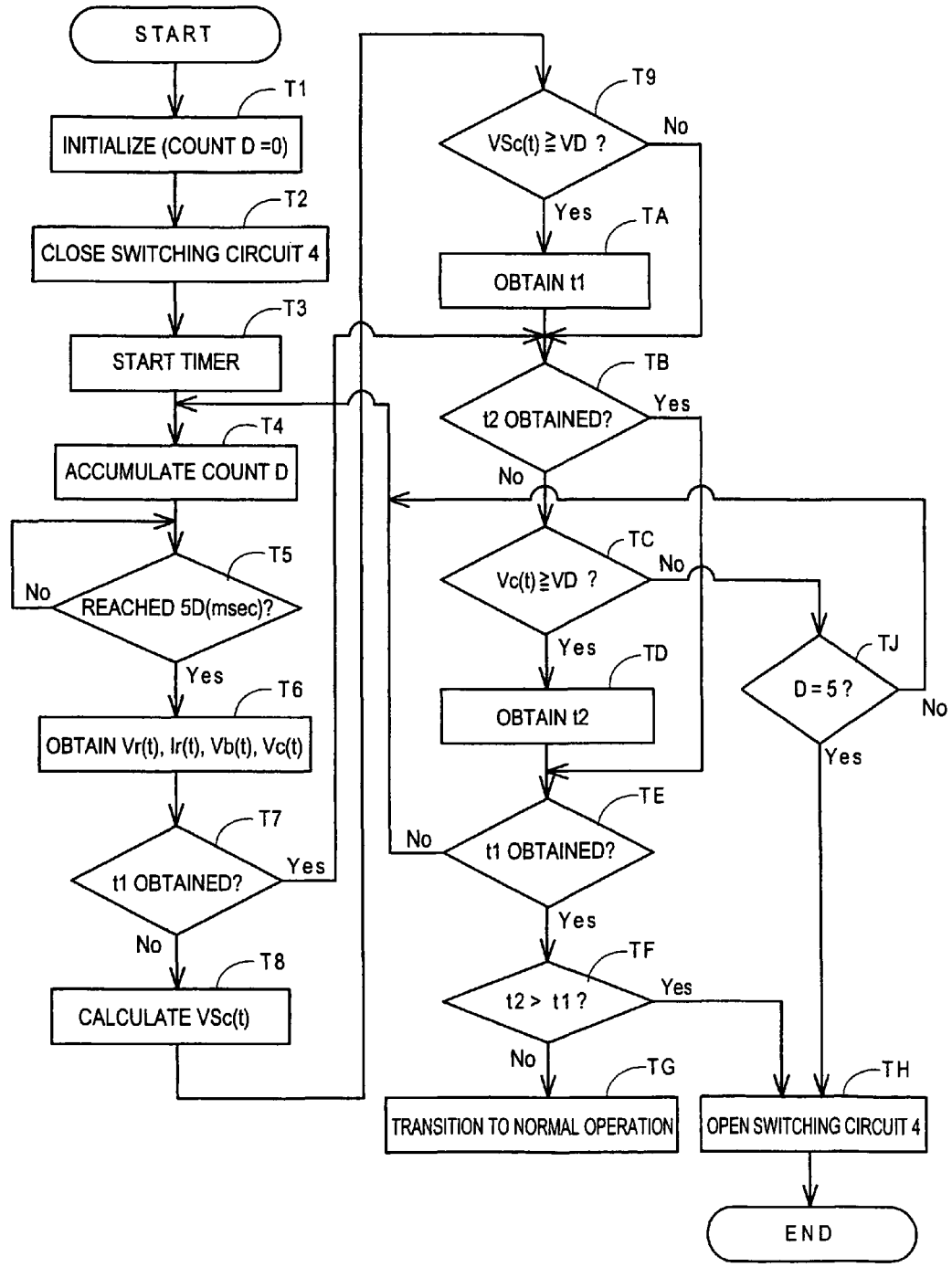
FIG. 5 is a flow chart of opening/closing control for a switching circuit according to the second embodiment.

Reference is made to FIG. 5 to describe the opening/closing control of the inverter 22 of the second embodiment.

First, the program for the ECU 16 is initialized in Step T1. Concretely, count D=0 is set. Next, the program proceeds to Step T2 and the switching circuit 4 is closed (ON) in response to an instruction from the ECU 16. Thereby, energization is started by supplying current from the battery 1 to the smoothing capacitor 3 and the inverter circuit 5 through the limiting resistor 2, so that the inverter 22 is activated. In Step T3, the timer starts to count time t elapsing after the start of energization.

Next, the program proceeds to Step T4 and the ECU 16 accumulates counts D. More specifically, since the processing of Step T6 is repeated as described later each time a specified time (=5 msec. in the second embodiment) elapses during the period after the start of energization until a first elapsed time $t_1$ and a second elapsed time $t_2$ are obtained, count D is incremented by one whenever Step T4 is effected. Then, the program proceeds to Step T5 and a check is made to determine whether the elapsed time counted by the timer (i.e., the time t elapsing after the start of energization) has reached 5D msec. (5 msec. when D=1). If it is determined that elapsed time t has not reached 5D msec. (NO), the program returns to Step T5 to repeat the determination of whether or not the elapsed time t has reached 5D msec.

After it is determined that elapsed time t has reached 5D msec (YES), the program proceeds to T6 and the ECU 16 obtains the resistor current Ir(t) at this time point (t=5D msec) from the current sensor 7. Further, the ECU 16 obtains the power source voltage Vb(t) at the time point (t=5D msec) from the power source voltage sensor 8 and obtains the capacitor inter-terminal voltage Vc(t) at the time point (t=5D msec) from the capacitor voltage sensor 9. Then, the ECU 16 calculates the resistor inter-terminal voltage Vr(t) (=Vb(t)−Vc(t)) of the limiting resistor 2 at the time point (t=5D msec) by subtracting the capacitor inter-terminal voltage Vc(t) from the power source voltage Vb(t).

Then, the program proceeds to Step T7 to determine whether the first elapsed time $t_1$ has been already obtained. Herein, the first elapsed time $t_1$ is the time t elapsing after a start of energization until the reference capacitor inter-terminal voltage VSc(t) described later reaches a set voltage value VD prestored in the ROM 6c of the ECU 16.

In Step T7, if it is determined that the first elapsed time $t_1$ has not been obtained yet (NO), the program proceeds to Step T8 to calculate the reference capacitor inter-terminal voltage VSc(t) of the smoothing capacitor 3 at the time point at which the time t (=5D msec.) elapses after the start of energization. Specifically, the reference capacitor inter-terminal voltage VSc(t) is calculated from:

$$VSc(t)=Vb(t)\times[1-\exp[(-t\times Ir(t))/(C\times Vr(t))]] \qquad \text{Eq. (2)}$$

where C represents the electrostatic capacitance of the smoothing capacitor 3.

The reference capacitor inter-terminal voltage VSc(t) is obtained from Equation (2), using the resistor inter-terminal voltage Vr(t) and resistor current Ir(t) corresponding to the actual resistance value Rr(t) of the limiting resistor 2 at the elapsing point of the time t after the start of energization.

Equation (2) gives, as the reference capacitor inter-terminal voltage VSc(t), the capacitor inter-terminal voltage generated in the smoothing capacitor 3 when the time constant does not vary after the start of energization until the elapse of the time t and is the actual time constant τ(t) (τ(t)=C×Rr(t)=C×Vr(t)/Ir(t)) at the elapsing point of the time t. More specifically, Equation (2) gives, as the reference capacitor inter-terminal voltage VSc(t), the capacitor inter-terminal voltage obtained in the case where the time constant does not vary, being equal to the greatest time constant τ(t) of the period between the start of energization and the elapse of the time t, that is, the time constant τ(t) with which the smoothing capacitor 3 is electrically charged at the slowest speed.

Figure 6:
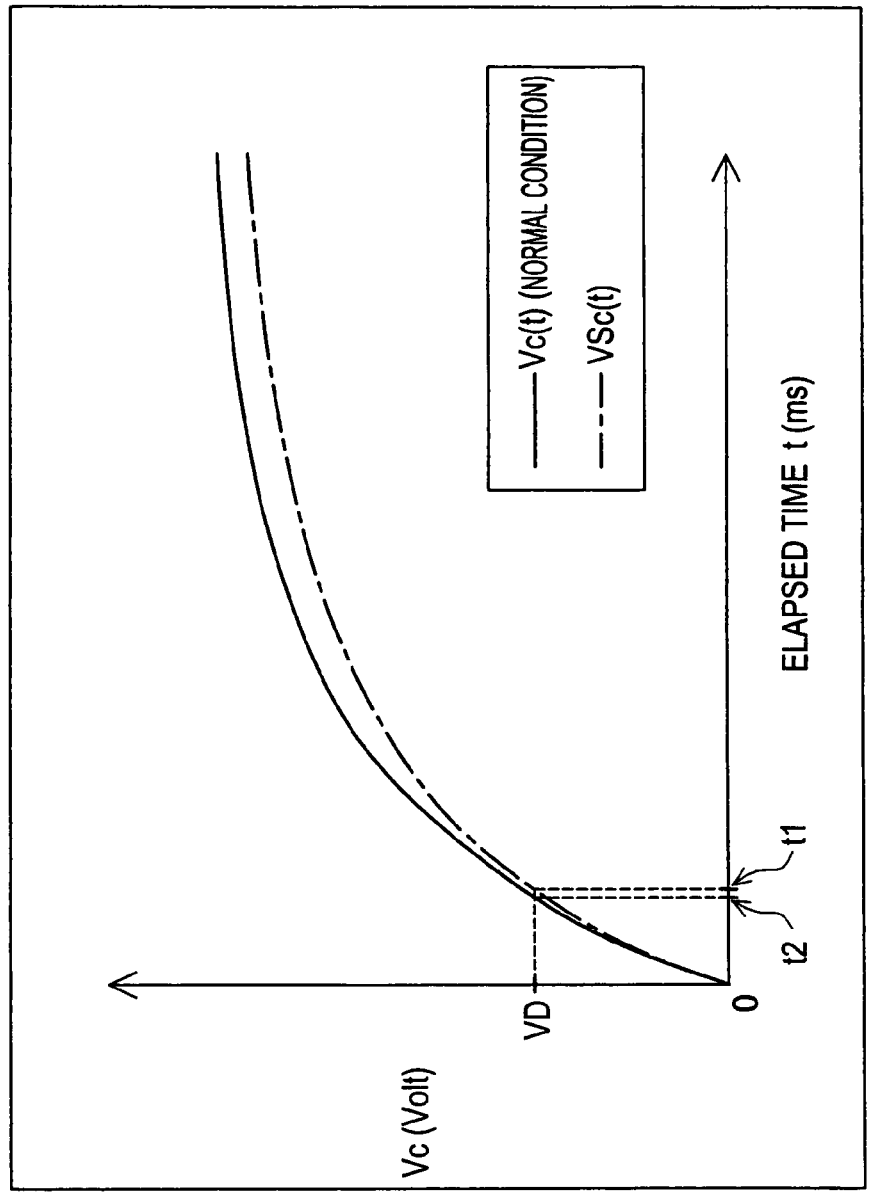
FIG. 6 is a graph showing the relationship between a first elapsed time $t_1$ and a second elapsed time $t_2$ in a normal condition in the inverter of the second embodiment.

The relationship between the time t elapsing after a start of energization and the reference capacitor inter-terminal voltage VSc(t) calculated from Equation (2) is indicated by alternate long and short dash line in FIG. 6. It should be noted that this graph is obtained where Ir(t) and Vr(t) in Equation (2) are the values when $t=t_1$, i.e., the fixed values $Ir(t_1)$ and $Vr(t_1)$. Changes in the actual capacitor inter-terminal voltage Vc(t) of the smoothing capacitor 3 where the inverter circuit 5 and the smoothing capacitor 3 are in a normal condition (i.e., when troubles such as short-circuit have not occurred) are indicated by solid line in FIG. 6.

If the inverter circuit 5 and the smoothing capacitor 3 are in their normal condition (i.e., when troubles such as short-circuit have not occurred), the resistance value of the limiting resistor 2 gradually increases after a start of energization, and therefore, it is conceivable that the time constant τ(t) increases with time. For this reason, the actual capacitor inter-terminal voltage Vc(t) at the elapsing point of the time t (indicated by solid line in FIG. 6), for instance, is thought to be higher than the value calculated from Equation (2) that is indicated by alternate long and short dash line. In other words, the actual capacitor inter-terminal voltage Vc(t) increases faster than the reference capacitor inter-terminal voltage VSc(t) obtained on assumption that the time constant τ(t) does not change and electricity is charged after the start of energization until the elapse of the time t with the unchanged time constant τ(t) at the elapsing point of the time t. It is therefore conceivable that as shown in FIG. 6, the second elapsed time $t_2$ during which the capacitor inter-terminal voltage Vc(t) reaches the set voltage value VD is shorter than the first elapsed time $t_1$ during which the reference capacitor inter-terminal voltage VSc(t) reaches the set voltage value VD.

Figure 7:
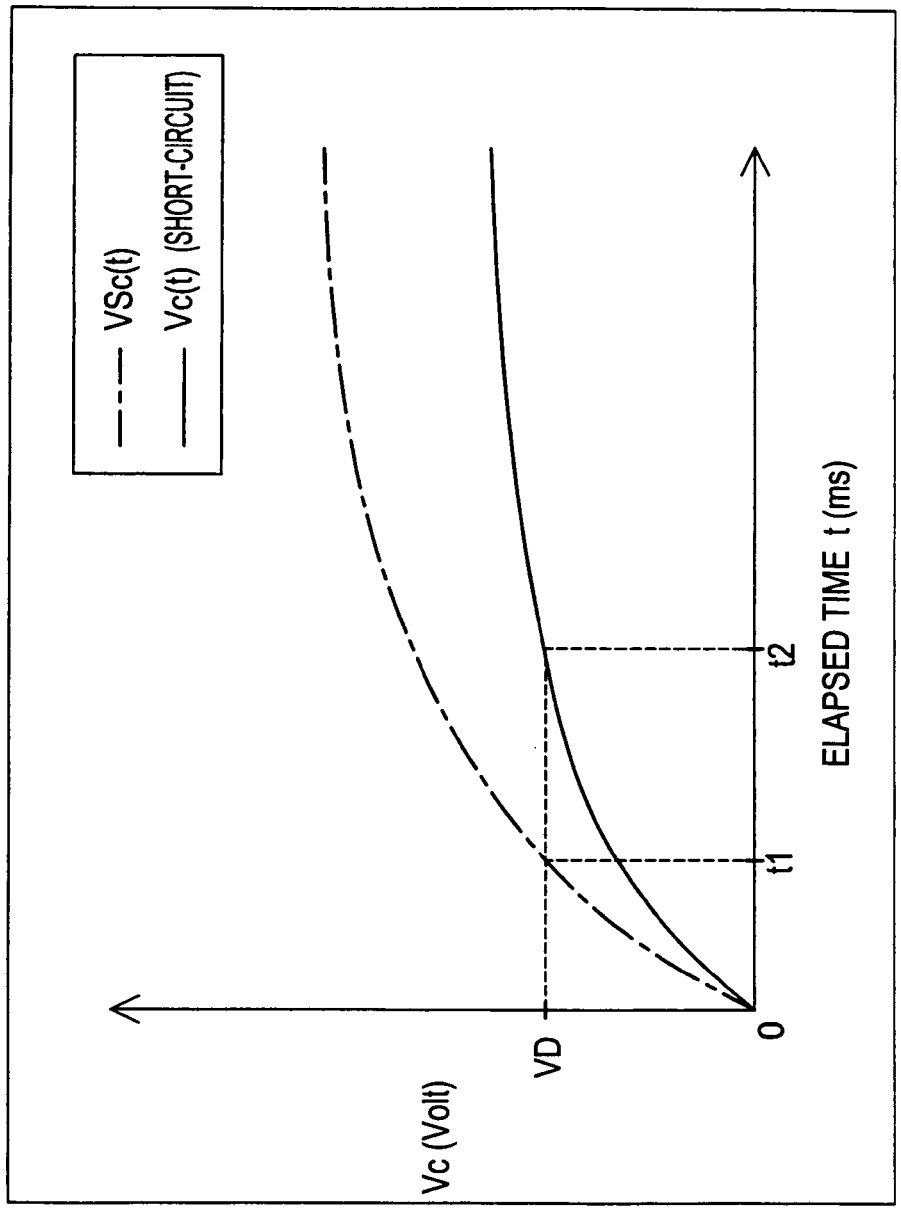
FIG. 7 is a graph showing the relationship between the first elapsed time $t_1$ and the second elapsed time $t_2$ in an abnormal condition in the inverter of the second embodiment.

If a trouble such as short-circuit has occurred in the inverter circuit 5 or the smoothing capacitor 3, the increase of the capacitor inter-terminal voltage Vc(t) indicated by solid line in FIG. 7 is thought to be slower than the increase of the reference capacitor inter-terminal voltage VSc(t) indicated by alternate long and short dash line in FIG. 7. Therefore, the second elapsed time $t_2$ is thought to be longer than the first elapsed time $t_1$. FIG. 7 shows a case where short-circuit has occurred in the inverter circuit 5.

The reference capacitor inter-terminal voltage VSc(t) is thus calculated from Equation (2) and compared to the actual capacitor inter-terminal voltage Vc(t), which makes it possible to properly determine whether the inverter circuit 5 and the smoothing capacitor 3 are in a normal or abnormal condition. As a result, a determination of whether or not the switching circuit 4 is to be opened can be adequately made in the succeeding steps TF to TH.

The program proceeds to Step T8 and then to Step T9 to determine whether the calculated, reference capacitor inter-terminal voltage VSc(t) at the present time has reached the set voltage value VD (VSc(t)≧VD). If it is determined that the reference capacitor inter-terminal voltage VSc(t) has reached the set voltage value VD (YES), the program proceeds to Step TA to obtain and store the time t elapsing at the point where the reference capacitor inter-terminal voltage VSc(t) reaches the set voltage value VD, as the first elapsed time $t_1$. On the other hand, if it is determined that the reference capacitor inter-terminal voltage VSc(t) has not reached the set voltage value VD (NO), the program proceeds to Step TB to determine whether the second elapsed time $t_2$ has been already obtained.

If it is determined in Step T7 that the first elapsed time $t_1$ has been obtained (YES), the program proceeds to Step TB without executing Steps T8 to TA described above and a check is made to determine whether the second elapsed time $t_2$ has been obtained. If it is determined in Step TB that the second elapsed time $t_2$ has not been obtained (NO), the program proceeds to Step TC to determine whether the capacitor inter-terminal voltage Vc(t) has reached the set voltage value VD (Vc(t)≧VD).

If it is determined in Step TC that the capacitor inter-terminal voltage Vc(t) has reached the set voltage value VD (YES), the program proceeds to Step TD to obtain and store the time t elapsing at the point when the capacitor inter-terminal voltage Vc(t) reaches the set voltage value VD, as the second elapsed time $t_2$.

On the other hand, if it is determined in Step TC that the capacitor inter-terminal voltage Vc(t) has not reached the set voltage value VD (NO), the program proceeds to Step TJ to determine whether the value of count D has reached 5 (D=5). If it is determined that the value of count D has not reached 5 (NO), the program return to Step T4 to perform the above series of processing.

If it is determined that the value of count D has reached 5 (YES), the program proceeds to Step TH to open the switching circuit 4.

If the capacitor inter-terminal voltage Vc(t) has not reached the set voltage value VD even though the value of count D has reached 5, that is, even though 25 msec. has elapsed after the start of energization, there is a possibility that short-circuit has occurred in the smoothing capacitor. In such a case, if the energization is continued until the capacitor inter-terminal voltage Vc(t) reaches the set voltage value VD, the resistor current Ir will excessively, continuously flow into the limiting resistor 2 and the temperature of the limiting resistor 2 may abnormally rise (burnout).

To cope with such a situation, the second embodiment is designed to forcibly open the switching circuit 4 without obtaining the second elapsed time $t_2$ in cases where the capacitor inter-terminal voltage Vc(t) has not reached the set voltage value VD even if the value of count D has reached 5, that is, even if 25 msec. has elapsed after the start of energization. Thereby, the energization with current supplied through the limiting resistor 2 can be properly shut off and, in consequence, an abnormal temperature rise (burnout) in the limiting resistor 2 can be prevented.

It should be noted that, in the second embodiment, the time limit is set to 25 msec. and Steps TC, TJ, TH correspond to the forcible open circuit instructing means of the invention.

After the second elapsed time $t_2$ is obtained in Step TD, the program proceeds to Step TE. If it is determined in the preceding Step TB that the second elapsed time $t_2$ has been obtained (YES), the program proceeds to Step TE without executing the processing of the above Steps TC, TD. In Step TE, a check is made to determine whether the first elapsed time $t_1$ has been already obtained. If it is determined that the first elapsed time $t_1$ has not been obtained yet (NO), the program returns to Step T4 to perform the series of processing described above. On the other hand, if it is determined in Step TE that the first elapsed time $t_1$ has been obtained (YES), the program proceeds to Step TF to determine whether the second elapsed time $t_2$ is longer than the first elapsed time $t_1$ ($t_2 > t_1$ ?).

If it is determined in Step TF that the second elapsed time $t_2$ is longer than the first elapsed time $t_1$ (YES), the program proceeds to Step TH in which the ECU 16 instructs to open the switching circuit 4. This is because there is a possibility that troubles such as short-circuit may have occurred in the smoothing capacitor 3 or the inverter circuit 5. Thereby, the energization with current supplied through the limiting resistor 2 can be shut off so that an abnormal temperature rise (burnout) in the limiting resistor 2 can be prevented.

On the other hand, if it is determined that the second elapsed time $t_2$ is equal to or shorter than the first elapsed time $t_1$ (NO), the program proceeds to Step TG and the energization is continued to start normal operation without opening the switching circuit 4 (i.e., while keeping the switching circuit 4 in its closed state).

In the second embodiment, whether or not the switching circuit 4 is to be opened is determined, using the first elapsed time $t_1$ as a benchmark, the first elapsed time $t_1$ being obtained based on the actually measured or calculated resistor inter-terminal voltage Vr(t) and resistor current Ir(t), that is, the resistor inter-terminal voltage Vr(t) and resistor current Ir(t) which correspond to the actual resistance value of the limiting resistor 2 (i.e., the resistance value taking account of the temperature of the limiting resistor 2). Unlike the case where an increase in the resistance value (and the subsequent increase in the time constant τ) caused by a rise in the temperature of the limiting resistor 2 is not taken into account, the second embodiment has such an advantage that the switching circuit 4 is not erroneously opened but properly opened according to need and, in consequence, an abnormal temperature rise (burnout) in the limiting resistor 2 can be prevented.

In the second embodiment, if the inverter circuit 5 and the smoothing capacitor 3 are in their normal condition (i.e., when troubles such as short-circuit have not occurred), the energization can be properly continued without erroneously opening the switching circuit 4. On the other hand, if a trouble such as short-circuit has occurred in the inverter circuit 5 or the smoothing capacitor 3, the switching circuit 4 is properly opened thereby shutting off the energization with current supplied through the limiting resistor 2 so that an abnormal temperature rise (burnout) in the limiting resistor 2 can be prevented.

Steps T4 to T6 of the second embodiment corresponds to the voltage obtaining means and sequential voltage obtaining means of the invention and Steps T7 to TH correspond to the open circuit instructing means of the invention. Of Steps T7 to TH, Steps T7, T8 correspond to the sequential reference voltage calculating means of the invention; Steps T9, TA correspond to the first elapsed time obtaining means; Steps TB to TD correspond to the second elapsed time obtaining means; and Steps TE to TH correspond to the time-basis open circuit determining means.

Third Embodiment

Next, an inverter 23 (inrush current limiting circuit 43) according to a third embodiment of the invention will be explained with reference to the drawings.

As seen from FIG. 1, the inverter 23 (inrush current limiting circuit 43) of the third embodiment does not differ from the inverter 21 (inrush current limiting circuit 41) of the first embodiment except the ECU (circuit controller) for controlling the opening/closing of the switching circuit 4. Concretely, the ECU 26 of the third embodiment differs from the ECU 6 of the first embodiment in the processing performed with the stored program. Therefore, only the opening/closing control different from that of the first embodiment is explained herein and an explanation of other points will be skipped.

As illustrated in FIG. 1, the inverter 23 equipped with the battery 1 is defined as "inverter with battery 33", and the inrush current limiting circuit 43 equipped with the battery 1 is defined as "inrush current limiting circuit with battery 53".

Figure 8:
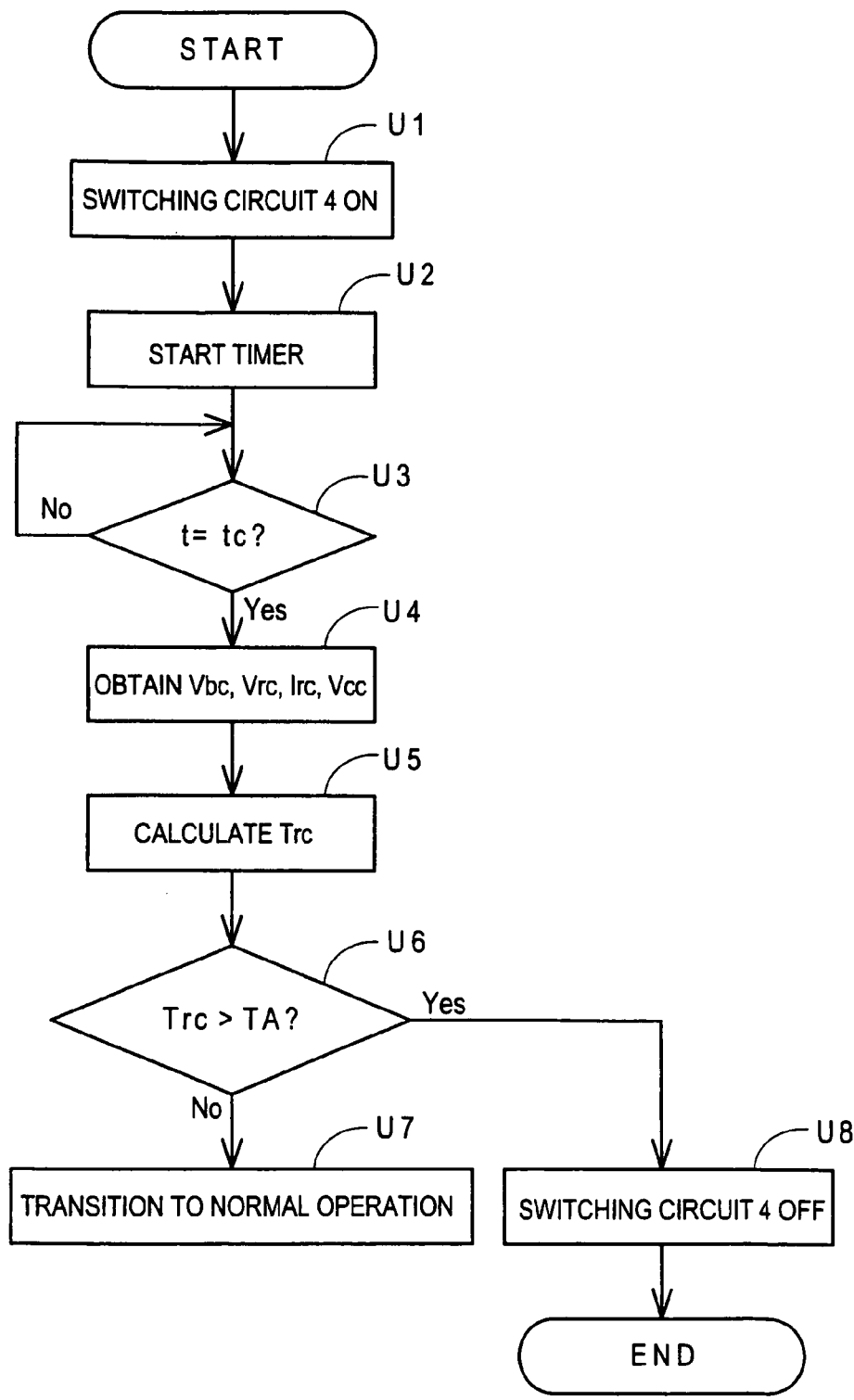
FIG. 8 is a flow chart of opening/closing control for a switching circuit according to the third embodiment.

Reference is made to FIG. 8 to describe the opening/closing control of the third embodiment.

First, the switching circuit 4 is closed (ON) in response to an instruction from the ECU 26 in Step U1. Thereby, energization with current supplied from the battery 1 to the smoothing capacitor 3 and the inverter circuit 5 through the limiting resistor 2 starts, so that the inverter 23 is activated. In Step U2, the timer starts to count time t elapsing after the start of energization.

Next, the program proceeds to Step U3 and the ECU 26 determines whether the time t elapsing after the start of energization has reached a reference time tc prestored in the ROM 6c. If it is determined that the elapsed time t has not reached the reference time tc yet (NO), the program returns to Step U3 to repeat the determination of whether the elapsed time t has reached the reference time tc.

Upon determination that the elapsed time t has reached the reference time tc (YES), the program proceeds to Step U4 and the ECU 26 obtains, from the current sensor 7, the resistor current Irc at the elapsing point of the reference time tc. Further, the ECU 26 obtains the power source voltage Vbc at the elapsing point of the reference time tc from the power source voltage sensor 8 and obtains the capacitor inter-terminal voltage Vcc at the elapsing point of the reference time tc from the capacitor voltage sensor 9. Then, the resistor inter-terminal voltage Vrc (=Vbc−Vcc) at the elapsing point of the reference time tc is calculated by subtracting the obtained capacitor inter-terminal voltage Vcc from the obtained power source voltage Vbc.

Then, the program proceeds to Step U5 to calculate the temperature Trc of the limiting resistor 2 at the elapsing point of the reference time tc. More specifically, the temperature Trc of the limiting resistor 2 is calculated from:

$$Trc=[[\{((Vrc-Vcc)/Irc)/Rro\}-1]/\alpha]+Tro \qquad \text{Eq. (3)}$$

where Tro represents reference temperature (Tro=25° C. in the third embodiment); α represents the resistor temperature coefficient of the limiting resistor 2, and Rro represents the resistance value of the limiting resistor 2 at the reference temperature Tro.

In the third embodiment, since the temperature Trc of the limiting resistor 2 is calculated based on the actual resistor inter-terminal voltage Vrc and resistor current Irc at the elapsing point of the reference time tc as shown in Equation (3), the temperature Trc of the limiting resistor 2 can be accurately calculated. That is, the calculated temperature Trc with a small deviation from the actual temperature of the limiting resistor 2 can be obtained.

Then, the program proceeds to Step U6 to determine whether the calculated temperature Trc of the limiting resistor 2 exceeds a permissible temperature TA (Trc>TA). In the third embodiment, the permissible temperature TA is set to the upper limit of temperature at which the limiting resistor 2 is not burnt out and prestored in the ROM 6c of the ECU 26. If the calculated temperature Trc of the limiting resistor 2 exceeds the permissible temperature TA (YES), the program proceeds to Step U8 in which the ECU 26 instructs to open the switching circuit 4 (OFF). Thereby, the energization with current supplied through the limiting resistor 2 can be shut off so that an abnormal temperature rise (burnout) in the limiting resistor 2 can be prevented. On the other hand, if the calculated temperature Trc of the limiting resistor 2 is equal to or lower than the permissible temperature TA (NO), the program proceeds to Step U7 and the energization is continued to start normal operation, without opening the switching circuit 4 (i.e., while keeping the switching circuit 4 in its closed state).

As described above, in the third embodiment, whether or not the switching circuit 4 is to be opened (OFF) is determined based on the accurately calculated temperature Trc of the limiting resistor 2 (with a small deviation from the actual temperature of the limiting resistor 2). Accordingly, the determination of whether or not the switching circuit 4 is to be opened can be accurately made, which leads to proper prevention of an abnormal temperature rise (burnout) in the limiting resistor 2.

Generally, if the initial temperature of the limiting resistor 2 is high at a start of energization with current supplied from the battery 1 through the limiting resistor 2 even when the inverter circuit 5 and the smoothing capacitor 3 are in their normal condition (i.e., even when troubles such as short-circuit have not occurred), there is a possibility that an abnormal temperature rise (burnout) occurs owing to a rise in the temperature of the limiting resistor 2 entailed by the energization. For instance, in cases where a motor car (e.g., hybrid car) equipped with the inverter 23 of the third embodiment is restarted (reenergization) immediately after stopping, the initial temperature of the limiting resistor 2 rises to about 125° C. in some cases. If the energization with current supplied through the limiting resistor 2 is continued in such a case, an abnormal temperature rise (burnout) will occur irrespective of whether or not the inverter circuit 5 and the smoothing capacitor 3 are in their normal condition (i.e., irrespective of whether or not troubles such as short-circuit have occurred).

To deal with this situation, the third embodiment is designed such that a check is made to determine if the calculated temperature Trc of the limiting resistor 2 exceeds the permissible temperature TA, thereby determining whether the switching circuit 4 is to be opened. If the calculated temperature Trc of the limiting resistor 2 exceeds the permissible temperature TA irrespective of whether or not the inverter circuit 5 and the smoothing capacitor 3 are in their normal condition (i.e., irrespective of whether or not troubles such as short-circuit have occurred), the switching circuit 4 will be opened without fail, thereby shutting off the energization with current supplied through the limiting resistor 2. Therefore, according to the inverter 23 (inrush current limiting circuit 43) of the third embodiment, not only an abnormal temperature rise (burnout) in the limiting resistor 2 caused by troubles such as short-circuit occurring in the inverter circuit 5 or the smoothing capacitor 3 but also an abnormal temperature rise in the limiting resistor 2 caused by reenergization or the like can be prevented.

Additionally, in the inverter 23 (inrush current limiting circuit 43) of the third embodiment, the temperature of the limiting resistor 2 can be obtained by calculation without use of a temperature sensor etc. for detecting the temperature of the limiting resistor 2. Accordingly, the third embodiment requires a smaller number of parts compared to the case where the temperature of the limiting resistor 2 is detected by a temperature sensor. In addition, this renders the inverter 23 more economical to produce and requires less installation space.

In the third embodiment, Step U5 corresponds to the temperature calculating means of the invention. Steps U6 to U8 correspond to the temperature-basis open circuit determining means of the invention.

Modified Example 1

Referring to the drawings, an inverter 61 (inrush current limiting circuit 81) constructed according to Modified Example 1 of the invention will be described.

The inverter 61 of Modified Example 1 (inrush current limiting circuit 81) does not differ from the inverter 21 (inrush current limiting circuit 41) of the first embodiment except that main relays 12, 13 are additionally used in the inverter 61. Therefore, only the opening/closing control differing from that of the first embodiment is described herein and an explanation of other points is omitted.

Figure 9:
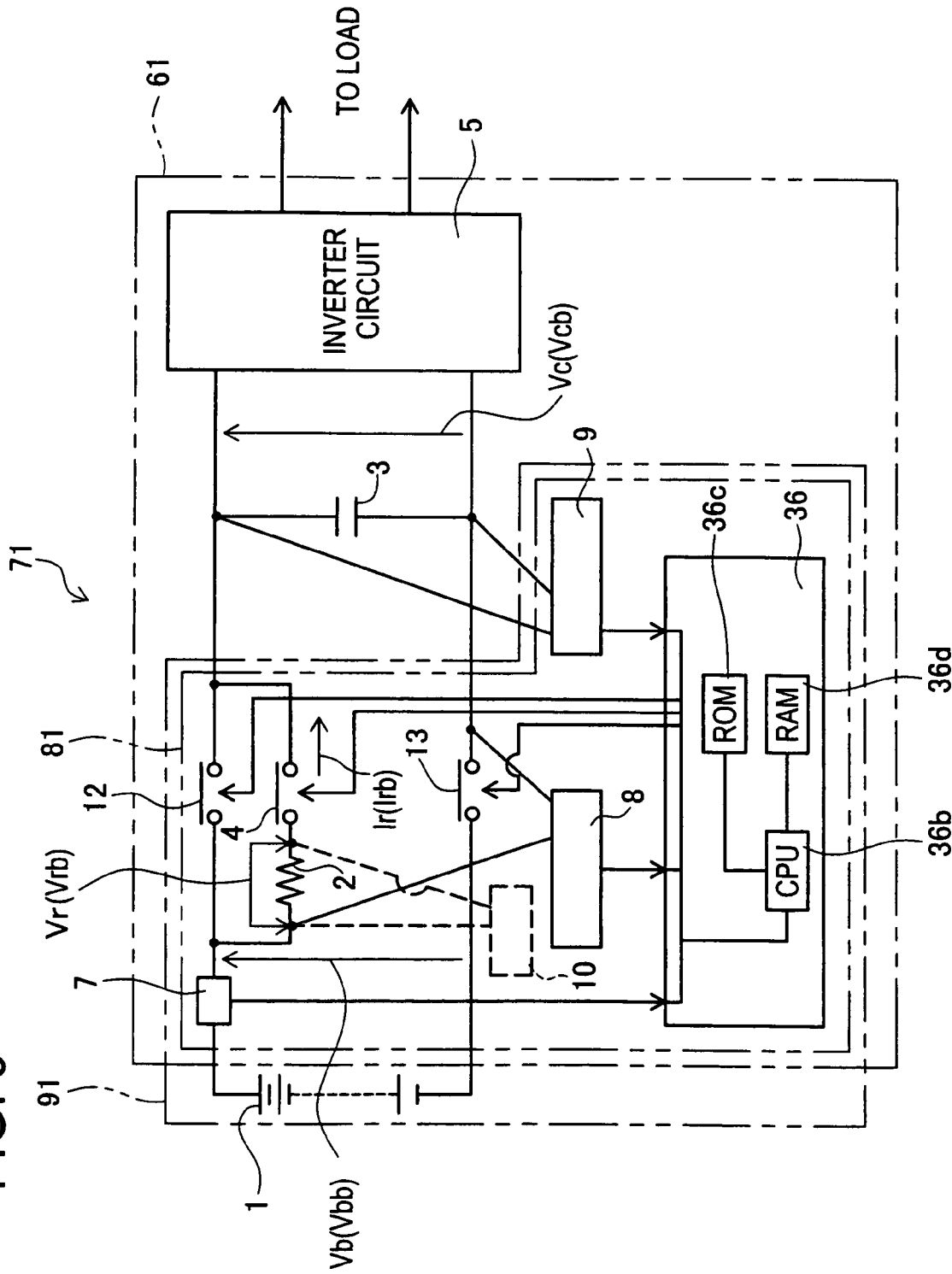
FIG. 9 is a structural diagram of an inverter according to Modified Example 1.

As illustrated in FIG. 9, the inverter 61 equipped with the battery 1 is defined as "inverter with battery 71". The inrush current limiting circuit 81 equipped with the battery 1 is defined as "inrush current limiting circuit with battery 91".

As illustrated in FIG. 9, the inverter 61 of Modified Example 1 includes the main relays 12, 13 in addition to the parts of the inverter 21 of the first embodiment. The main relay 12 is located closer to the positive electrode side of the battery (d.c. power source) 1 than the inverter circuit 5 and the smoothing capacitor 3 are and is connected to the switching circuit 4 and the limiting resistor 2 in parallel. The main relay 13 is located closer to the negative electrode side of the battery (d.c. power source) 1 than the inverter circuit 5 and the smoothing capacitor 3 are. An ECU (circuit controller) 36 controls the opening/closing of the main relays 12, 13 in addition to the opening/closing of the switching circuit 4.

Figure 10:
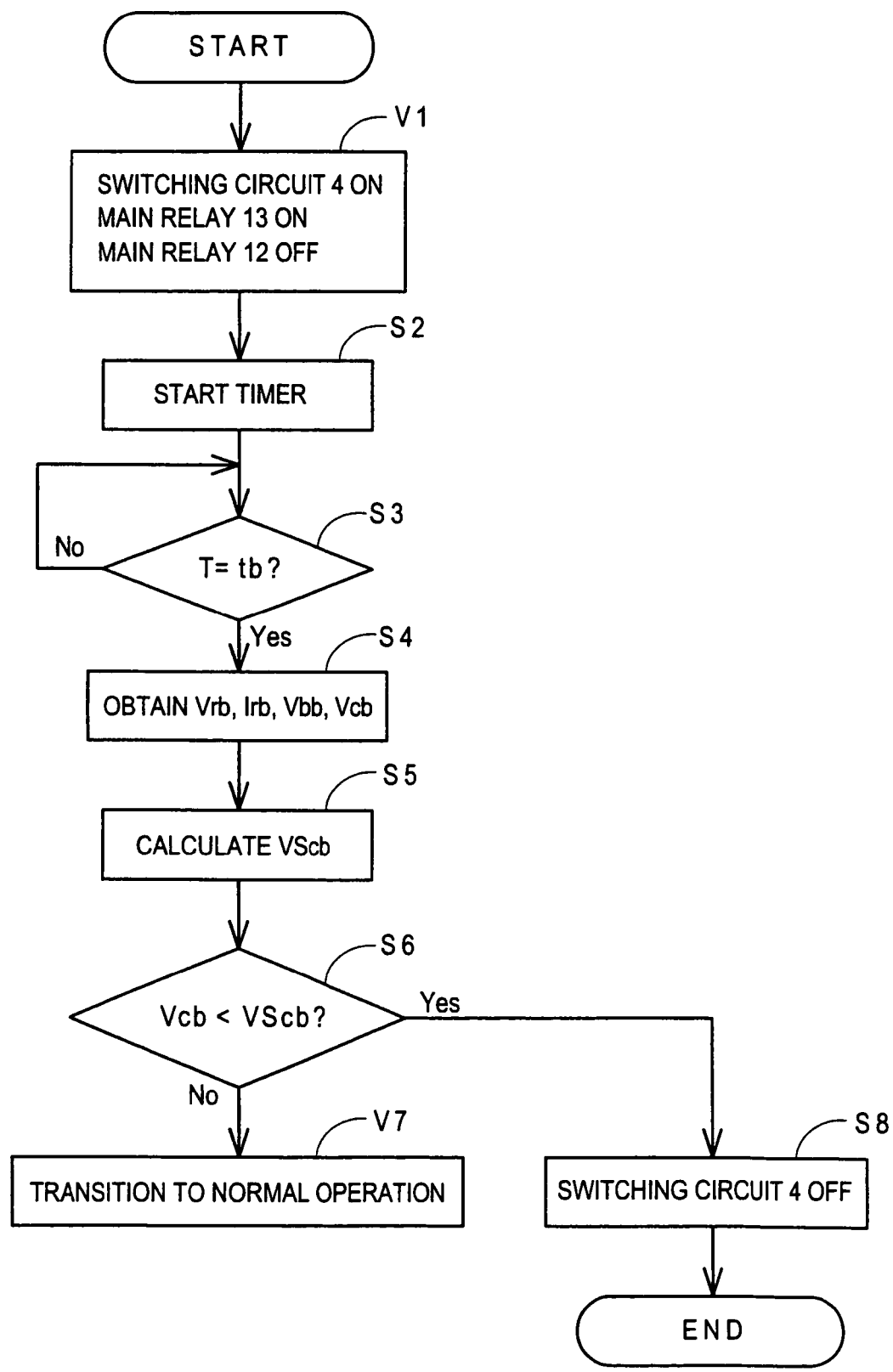
FIG. 10 is a flow chart of opening/closing control for a switching circuit and main relays according to Modified Example 1.

Reference is now made to FIG. 10 to describe the opening/closing control of Modified Example 1.

First, in Step V1, the switching circuit 4 is closed (ON) in response to an instruction from the ECU 6 and the main relay 13 is closed (ON). It should be noted that the main relay 12 has been opened (OFF) beforehand. Thereby, energization with current supplied from the buttery 1 to the smoothing capacitor 3 and the inverter circuit 5 through the limiting resistor 2 starts, so that the inverter 61 is activated. Thereafter, the processing of Steps S2 to S6 is performed similarly to the first embodiment.

If it is determined in Step S6 that the capacitor inter-terminal voltage Vcb is lower than the reference capacitor inter-terminal voltage VScb (YES), the program proceeds to Step S8 and the ECU 6 instructs to open the switching circuit 4, similarly to the first embodiment. Thereby, the energization with current supplied through the limiting resistor 2 can be shut off to prevent an abnormal temperature rise (burnout) in the limiting resistor 2.

On the other hand, if it is determined in Step S6 that the capacitor inter-terminal voltage Vcb is equal to or higher than the reference capacitor inter-terminal voltage VScb (NO), the program proceeds to Step V7 to start normal operation. More concretely, after the energization is continued for a specified time while the switching circuit 4 and the main relay 13 being kept closed, the main relay 12 is closed (ON) and then the switching circuit 4 is opened (OFF). Thereby, electric current is supplied from the buttery 1 to the inverter circuit 5 without passing through the limiting resistor 2 and the inverter circuit 5 starts conversion of the electric current into a.c. power.

Although the invention has been described according to the first to third embodiments and Modified Example 1 in the foregoing description, it is apparent that the invention is not necessarily limited to the particular embodiments shown herein and various changes and modifications are made to the disclosed embodiments without departing from the spirit and scope of the invention.

For example, while nickel-metal hydride batteries are used as the d.c. power source in the first and other embodiments, lithium ion batteries may be used instead.

While the first embodiment is associated with an example in which the reference capacitor inter-terminal voltage VScb is calculated directly from the following Equation (1) in Step S5, the reference capacitor inter-terminal voltage VScb may be calculated in a stepwise manner, using the following Equations (4), (5), (6). The value of the reference capacitor inter-terminal voltage VScb obtained by the stepwise calculation is the same as of the calculation by use of Equation (1).

$$VScb = Vbb \times [1 - \exp((-tb \times Irb)/(C \times Vrb))] \quad (1)$$

$$Rrb = (Vrb - Vcb)/Irb \quad (4)$$

$$\tau b = C \times Rrb \quad (5)$$

$$VScb = Vbb \times [1 - \exp(-tb/\tau b)] \quad (6)$$

In the second embodiment, the reference capacitor inter-terminal voltage VSc(t) is calculated directly from the following Equation (2) in Step T8. However, the reference capacitor inter-terminal voltage VSc(t) may be calculated in a stepwise manner, using the following Equations (7), (8), (9). The value of the reference capacitor inter-terminal voltage VSc(t) obtained by the stepwise calculation is the same as of the calculation by use of Equation (2).

$$VSc(t) = Vb(t) \times [1 - \exp[(-t \times Ir(t))/(C \times Vr(t))]] \quad (2)$$

$$Rr(t) = (Vr(t) - Vc(t))/Ir(t) \quad (7)$$

$$\tau(t) = C \times Rr(t) \quad (8)$$

$$VSc(t) = Vb(t) \times [1 - \exp(-t/\tau(t))] \quad (9)$$

In the third embodiment, the temperature Trc of the limiting resistor 2 is calculated directly from the following Equation (3) in Step U5. However, the temperature Trc of the limiting resistor 2 may be calculated in a stepwise manner, using the following Equations (10), (11).

$$Trc = [[\{((Vrc - Vcc)/Irc)/Rro\} - 1]/\alpha] + Tro \quad (3)$$

$$Rrc = (Vrc - Vcc)/Irc \quad (10)$$

$$Trc = [[(Rrc/Rro) - 1]/\alpha] + Tro \quad (11)$$

Another alternative way is such that data on the relationship between the temperature and resistance value of the limiting resistor 2 are obtained beforehand and the temperature corresponding to the resistance value that corresponds to the resistor inter-terminal voltage Vrc and resistor current Irc is obtained from the data as the temperature Trc of the limiting resistor 2.

No matter which of the above ways is selected, the temperature Trc of the limiting resistor 2 can be calculated based on the resistor inter-terminal voltage Vrc and the resistor current Irc.

As a modification of the first embodiment, Modified Example 1 has been explained which provides the inverter 61 (inrush current limiting circuit 81) having the main relays 12, 13 in addition to the parts of the inverter 21 (inrush current limiting circuit 41). Similarly to this, there may be employed circuit configurations in which the main relays 12, 13 are added to the inverter 22 (inrush current limiting circuit 42) of the second embodiment or the inverter 23 (inrush current limiting circuit 43) of the third embodiment.

In the first to third embodiments and Modified Example 1, the inverters 21, 22, 23 each having the power source voltage sensor 8 and the capacitor voltage sensor 9 as illustrated in FIGS. 1 and 9 have been described. According to the inverters 21, 22, 23, when obtaining the resistor inter-terminal voltage Vr (Vrb, Vr(t), Vrc), the power source voltage Vb (Vbb, Vb(t), Vbc) is first obtained by use of the power source voltage sensor 8 and the capacitor voltage Vc (Vcb, Vc(t), Vcc) is obtained by use of the capacitor voltage sensor 9. Then, the resistor inter-terminal voltage Vr (Vrb, Vr(t), Vrc) is obtained from the difference between these voltages (see Steps S4, T6, U4 of FIGS. 2, 5, 8, 10).

It is also possible to obtain the resistor inter-terminal voltage Vr (Vrb, Vr(t), Vrc) of the limiting resistor 2 directly from a resistor voltage sensor 10, for example, in Steps S4, T6, U4 of FIGS. 2, 5, 8, 10, the resistor voltage sensor 10 being provided in the inverter so as to be connected to both terminals of the limiting resistor 2 as indicated by broken line in FIGS. 1 and 9.

What is claimed is:

1. An inrush current limiting circuit interposed between a d.c. power source and a combination of an inverter circuit and a smoothing capacitor, the circuit comprising:
    a limiting resistor connected to the inverter circuit and the smoothing capacitor in series, for limiting inrush current from the d.c. power source to the inverter circuit and the smoothing capacitor through the limiting resistor itself;
    a switching circuit for allowing and disallowing a flow of resistor current in the limiting resistor within a period during which the inrush current flows through the limiting resistor; and
    open circuit instructing means for instructing to open the switching circuit based on a resistor inter-terminal voltage of the limiting resistor and based on the resistor current, wherein the open circuit instructing means includes:
    fixed time reference voltage calculating means for calculating a reference capacitor inter-terminal voltage of the smoothing capacitor at a time point at which a reference time elapses, based on the resistor inter-terminal voltage and the resistor current at the time point at which the reference time elapses, after a start of energization with current supplied from the d.c. power source through the switching circuit and the limiting resistor at least in a stage of activating an inverter equipped with the inrush current limiting circuit, the inverter circuit and the smoothing capacitor; and
    voltage-basis open circuit determining means for determining whether or not the switching circuit is to be opened based on the reference capacitor inter-terminal voltage and a capacitor inter-terminal voltage of the smoothing capacitor at the time point at which the reference time elapses.

2. The inrush current limiting circuit according to claim 1, wherein the fixed time reference voltage calculating means calculates the reference capacitor inter-terminal voltage VScb at a time point at which a reference time tb elapses from:

$$VScb = Vbb \times [1 - \exp((-tb \times Irb)/(C \times Vrb))] \qquad \text{Eq. (1)}$$

where C is the electrostatic capacitance of the smoothing capacitor;
    tb is the reference time;
    Vrb is the resistor inter-terminal voltage at the time point at which the reference time tb elapses;
    Irb is the resistor current at the time point at which the reference time tb elapses; and
    Vbb is the power source voltage at the time point at which the reference time tb elapses.

3. An inrush current limiting circuit with a battery, comprising the inrush current limiting circuit described in claim 1 and a battery serving as the d.c. power source.

4. An inrush current limiting circuit interposed between a d.c. power source and a combination of an inverter circuit and a smoothing capacitor, the circuit comprising:
    a limiting resistor connected to the inverter circuit and the smoothing capacitor in series, for limiting inrush current from the d.c. power source to the inverter circuit and the smoothing capacitor through the limiting resistor itself;
    a switching circuit for allowing and disallowing a flow of resistor current in the limiting resistor within a period during which the inrush current flows through the limiting resistor;
    voltage obtaining means for obtaining the capacitor inter-terminal voltage of the smoothing capacitor, wherein the voltage obtaining means includes:
    sequential voltage obtaining means for obtaining the capacitor inter-terminal voltage each time a specified time elapses, after a start of energization with current supplied from the d.c. power source through the switching circuit and the limiting resistor at least in a stage of activating an inverter equipped with the inrush current limiting circuit, the inverter circuit and the smoothing capacitor; and
    open circuit instructing means for instructing to open the switching circuit based on a resistor inter-terminal voltage of the limiting resistor and based on the resistor current, wherein the open circuit instructing means includes:
    sequential reference voltage calculating means for calculating the reference capacitor inter-terminal voltage of the smoothing capacitor based on the resistor inter-terminal voltage and the resistor current each time the specified time elapses, after the start of energization;
    first elapsed time obtaining means for obtaining a first elapsed time elapsing after the start of energization until the reference capacitor inter-terminal voltage reaches a preset voltage value;
    second elapsed time obtaining means for obtaining a second elapsed time elapsing after the start of energization until the capacitor inter-terminal voltage reaches the preset voltage value; and
    time-basis open circuit determining means for determining whether or not the switching circuit is to be opened based on the first elapsed time and the second elapsed time.

5. The inrush current limiting circuit according to claim 4, wherein the sequential reference voltage calculating means calculates the reference capacitor inter-terminal voltage VSc(t) at a time point at which a time t elapses after the start of energization from:

$$VSc(t) = Vb(t) \times [1 - \exp[(-t \times Ir(t))/(C \times Vr(t))]] \qquad \text{Eq. (2)}$$

where C is the electrostatic capacitance of the smoothing capacitor;
    t is the time elapsing after the start of energization;
    Vr(t) is the resistor inter-terminal voltage at the time point at which the time t elapses;
    Ir(t) is the resistor current at the time point at which the time t elapses; and Vb(t) is the power source voltage at the time point at which the time t elapses.

6. An inrush current limiting circuit interposed between a d.c. power source and a combination of an inverter circuit and a smoothing capacitor, the circuit comprising:

a limiting resistor connected to the inverter circuit and the smoothing capacitor in series, for limiting inrush current from the d.c. power source to the inverter circuit and the smoothing capacitor through the limiting resistor itself;

a switching circuit for allowing and disallowing a flow of resistor current in the limiting resistor within a period during which the inrush current flows through the limiting resistor; and open circuit instructing means for instructing to open the switching circuit based on a resistor inter-terminal voltage of the limiting resistor and based on the resistor current, wherein the open circuit instructing means includes:

temperature calculating means for calculating the temperature of the limiting resistor based on the resistor inter-terminal voltage and the resistor current after a start of energization with current supplied from the d.c. power source through the switching circuit and the limiting resistor at least in a stage of activating the inverter equipped with the inrush current limiting circuit, the inverter circuit and the smoothing capacitor; and temperature-basis open circuit determining means for determining whether or not the switching circuit is to be opened based on the calculated temperature of the limiting resistor.

* * * * *